US012682491B2

(12) United States Patent
Di Febbo et al.

(10) Patent No.: US 12,682,491 B2
(45) Date of Patent: Jul. 14, 2026

(54) DISPLAY TRACKING SYSTEMS AND METHODS

(71) Applicant: Apple Inc., Cupertino, CA (US)

(72) Inventors: Paolo Di Febbo, Redwood City, CA (US); Anthony Ghannoum, Santa Clara, CA (US); Michele Stoppa, San Jose, CA (US); Kiranjit Dhaliwal, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/581,251

(22) Filed: Feb. 19, 2024

(65) Prior Publication Data

US 2024/0193810 A1 Jun. 13, 2024

Related U.S. Application Data

(63) Continuation of application No. 17/476,312, filed on Sep. 15, 2021, now Pat. No. 11,954,885.

(51) Int. Cl.
*G06T 7/73* (2017.01)
*G01S 5/02* (2010.01)
(Continued)

(52) U.S. Cl.
CPC .................. *G06T 7/74* (2017.01); *G06F 3/14* (2013.01); *G06T 13/00* (2013.01); *H04N 23/651* (2023.01);
(Continued)

(58) Field of Classification Search
CPC . G06T 7/74; G06T 13/00; G06T 2207/30204; G06T 7/248; G06F 3/14;
(Continued)

(56) References Cited

U.S. PATENT DOCUMENTS

| | | | |
|---|---|---|---|
| 10,539,644 B1 * | 1/2020 | Alarcon Herrera | ....... G01S 1/70 |
| 2013/0314439 A1 * | 11/2013 | Ota | ............ G06F 3/14 |
| | | | 345/629 |

(Continued)

FOREIGN PATENT DOCUMENTS

WO WO-2013023706 A1 * 2/2013 ........... G06F 3/0304

*Primary Examiner* — Devona E Faulk
*Assistant Examiner* — Donna J. Ricks
(74) *Attorney, Agent, or Firm* — Fletcher Yoder, P.C.

(57) ABSTRACT

A tracked device may be used in an extended reality system in coordination with a tracking device. The tracked device may be ordinarily difficult to track, for example due to changing appearances or relatively small surface areas of unchanging features, as may be the case with an electronic device with a relatively large display surrounded by a thin physical outer boundary. In these cases, the tracked device may periodically present an image to the tracking device that the tracking device stores as an indication to permit tracking of a known, unchanging feature despite the image not being presented continuously on the display of the tracked device. The image may include a static image, designated tracking data overlaid on an image frame otherwise scheduled for presentation, or extracted image features from the image frame otherwise scheduled for presentation. Additional power saving methods and known marker generation methods are also described.

20 Claims, 15 Drawing Sheets

(51) Int. Cl.

| | |
|---|---|
| *G01S 5/16* | (2006.01) |
| *G06F 3/14* | (2006.01) |
| *G06T 13/00* | (2011.01) |
| *H04N 23/65* | (2023.01) |
| *H04N 23/66* | (2023.01) |

(52) U.S. Cl.
CPC .......... *H04N 23/66* (2023.01); *G01S 5/02585* (2020.05); *G01S 5/16* (2013.01)

(58) Field of Classification Search
CPC .. H04N 23/651; H04N 23/66; G01S 5/02585; G01S 5/16; G01S 2201/01; H04L 67/131; H04L 67/535
See application file for complete search history.

(56) References Cited

U.S. PATENT DOCUMENTS

| | | | |
|---|---|---|---|
| 2015/0347850 A1 | 12/2015 | Berelejis et al. | |
| 2016/0055544 A1 | 2/2016 | Fedyaev | |
| 2017/0243403 A1* | 8/2017 | Daniels ................. | G06F 3/1454 |
| 2018/0053284 A1* | 2/2018 | Rodriguez ............ | G06F 1/3231 |
| 2019/0043448 A1* | 2/2019 | Thakur .................. | G09G 5/003 |
| 2019/0197784 A1 | 6/2019 | Kipman et al. | |
| 2020/0089313 A1* | 3/2020 | Himane ................ | G06F 3/0346 |
| 2021/0034870 A1 | 2/2021 | Ha | |
| 2021/0052348 A1* | 2/2021 | Schwägli ............... | A61B 90/39 |
| 2022/0224827 A1* | 7/2022 | Costa ................... | A61B 8/4245 |
| 2023/0062187 A1 | 3/2023 | Holland et al. | |
| 2023/0215015 A1* | 7/2023 | Yoshida ................. | G06T 7/248 |
| | | | 382/100 |

* cited by examiner

148

150 — 
DETERMINE TO PRESENT TRACKING DATA
WITH A NEXT IMAGE FRAME

152 — 
GENERATE AND TRANSMIT A NOTIFICATION
TO A TRACKING DEVICE

154 — 
PRESENT THE TRACKING DATA ON AN ELECTRONIC
DISPLAY WITH THE IMAGE FRAME SCHEDULED
FOR PRESENTATION DURING THE FRAME DURATION

156 — 
PROCEED WITH IMAGE PRESENTATION OPERATIONS
AFTER PRESENTING THE TRACKING FRAME

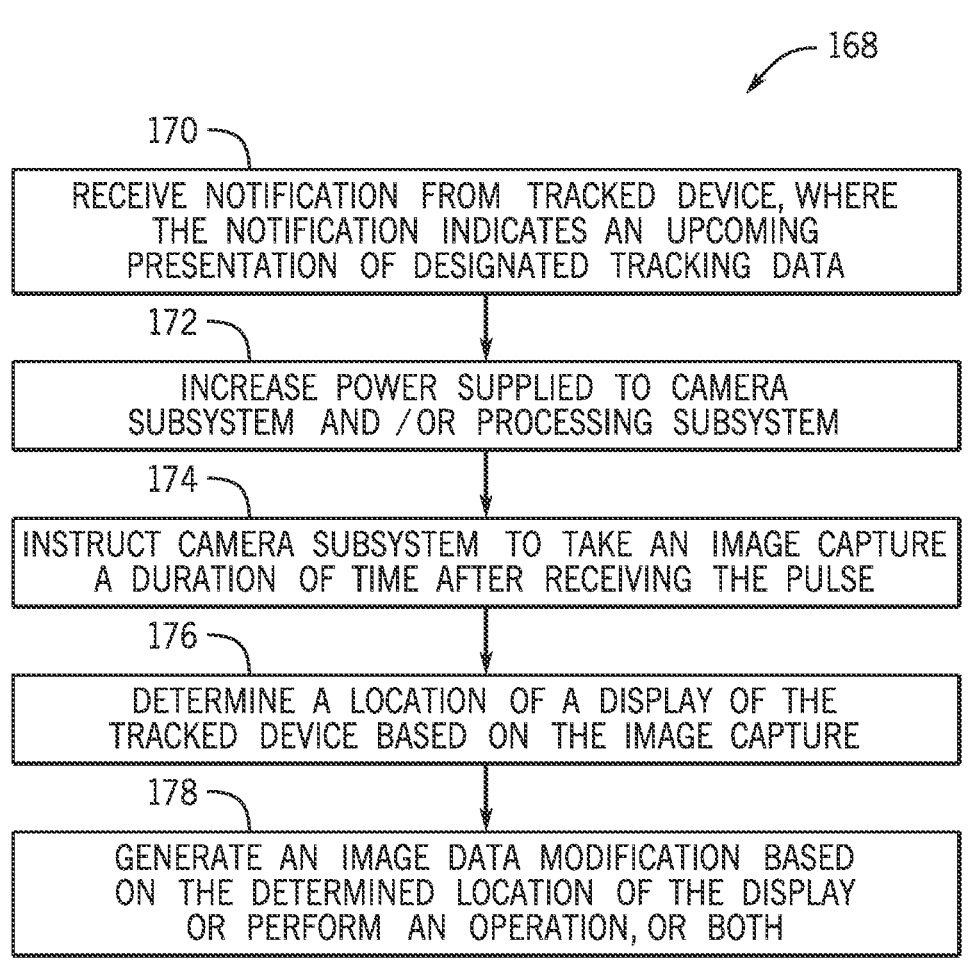

168

170
RECEIVE NOTIFICATION FROM TRACKED DEVICE, WHERE
THE NOTIFICATION INDICATES AN UPCOMING
PRESENTATION OF DESIGNATED TRACKING DATA

172
INCREASE POWER SUPPLIED TO CAMERA
SUBSYSTEM AND / OR PROCESSING SUBSYSTEM

174
INSTRUCT CAMERA SUBSYSTEM TO TAKE AN IMAGE CAPTURE
A DURATION OF TIME AFTER RECEIVING THE PULSE

176
DETERMINE A LOCATION OF A DISPLAY OF THE
TRACKED DEVICE BASED ON THE IMAGE CAPTURE

178
GENERATE AN IMAGE DATA MODIFICATION BASED
ON THE DETERMINED LOCATION OF THE DISPLAY
OR PERFORM AN OPERATION, OR BOTH

FIG. 11

DISPLAY TRACKING SYSTEMS AND METHODS

CROSS REFERENCE TO RELATED APPLICATIONS

This application claims priority from and the benefit of U.S. patent application Ser. No. 17/476,312, entitled "Display Tracking Systems and Methods", filed Sep. 15, 2021, which is hereby incorporated by reference in its entirety for all purposes.

BACKGROUND

The present disclosure relates generally to image feature tracking and, more particularly, to using image data processing to determine and track a location of an electronic device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Extended reality (XR), virtual reality (VR), augmented reality (AR), and mixed reality (MR) devices may provide an immersive experience in a virtual world. To allow a person to interact with virtual objects in the virtual world, some of these devices may use a camera to track a location of an object in the real world. Based on the location of the object in the real world, the virtual objects may behave in a particular way. For example, a person may use their hand in the real world to "push" or "pull" virtual objects in the virtual world. Tracking the location of an object based on its shape works well when the shape of the object remains constant or changes sufficiently slowly. Yet objects that display images on electronic displays, such as electronic devices like handheld or wearable devices, may be more difficult to track. Indeed, the apparent location of these objects could change depending on the images that happen to be displayed on their displays, potentially disrupting the experience of a seamless interaction between the real world and the virtual world.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first example, two electronic devices may be located in a physical environment. The first electronic device may present an image frame with tracking data on its display. The second electronic device may include a camera subsystem, memory, and a processor that monitors the tracking data as a way to track a location the display of the first electronic device, and thus a location of the first electronic device. After identifying the location of the first electronic device, the second electronic device may generate an animation, an immersive experience, an image, or the like, that follows or aligns with the location of the first electronic device. An animation, an immersive experience, or an image that tracks the location of the first electronic device in the physical environment may be overlaid or rendered adjacent on the first electronic device in a virtual environment. As the first electronic device moves within the physical environment, images of the first electronic device and of the animation, the immersive experience, or the image in the virtual environment move in association with the first electronic device as its location changes.

In a second example, a method may include using an early warning indication, or a signal indication, of incoming tracking data as a way to trigger returning power to certain portions of an electronic device. The electronic device may be a tracking device used to capture images of a tracked electronic device. The images may be presented via a display of the electronic device. By tracking the tracking data presented on a display of the tracked electronic device, the electronic device may track a location of the tracked electronic device. The electronic device may use the location of the tracked electronic device to manipulate an animation, such that the animation remains overlaid or a particular distance from the tracked electronic device in a virtual environment conveyed via the presentation of the images even while the tracked electronic device moves in the physical environment.

In a third example, a tracked device may generate its own tracking data. Tracking data may be generated by blending tracking data with image data to be presented on the tracked device. A tracking device may use the tracking data to determine where the tracked device is located within a physical environment, where a location of the tracked device may be correlated to a location of the tracking data in a captured image of the physical environment. Once located, images of the tracked device in a virtual world may be displayed proximate to or in association with other virtual images rendered by the tracking device. The virtual images may be associated with an animation, an immersive experience, an image, or the like.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 11 is a flow diagram of a process for operating the tracking device of FIG. 6 during a tracking operation corresponding to the tracked device of FIG. 6, in accordance with an embodiment;

DETAILED DESCRIPTION OF SPECIFIC EMBODIMENTS

Figure 1:
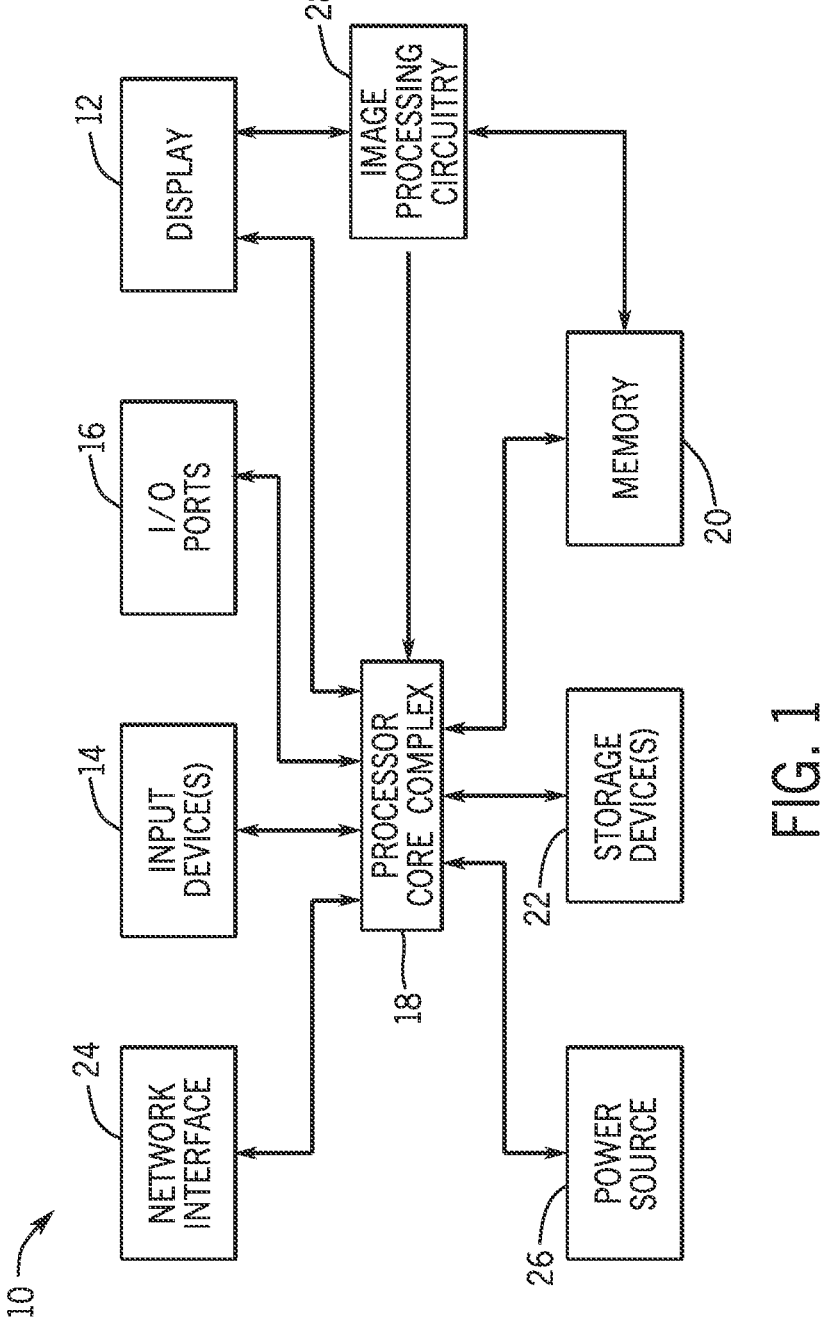
FIG. 1 is a block diagram of an electronic device with an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

By way of example, an electronic display may be or represent one or more displays for an entertainment system, such as in an extended reality (XR) system. An extended reality (XR) system may include real-and-virtual combined environments and human-machine interactions generated by computer technology and wearables. An extended reality (XR) system may support augmented reality (AR), mixed reality (MR), and virtual reality (VR). In some instances, the XR system may enable simulation of a three-dimensional image or environment that can be interacted with in a seemingly real or physical way. Sometimes this involves using special electronic equipment (e.g., helmet or glasses with a display inside or gloves fitted with sensors), referred to as virtual reality (VR). The XR system may also enable the three-dimensional image to project onto real objects, merging realities, referred to as augmented reality (AR). In other instances, the entertainment system may combine elements of both AR and VR, in which real-world and digital objects interact, referred to as mixed reality (MR). The XR system may also update the displayed image as the user moves or changes orientation using gyroscopes, accelerometers, or the like. In many cases, the image data to be displayed for the XR system may include multiple frames of image data (e.g., streams of image data).

An XR system may take many forms. For example, an XR system may take the form of a handheld or tablet device that uses its display to provide an augmented reality (AR) or mixed reality (MR) experience. Other XR systems may take the form of head-mounted displays (HMDs). In these, the user may see two separate images of image data on the display of the XR system, one for the left eye and one for the right eye, which the user may perceive as a single image in three-dimensional form. Moreover, the XR system may include multiple cameras capturing the multiple frames of image data, and may use multiple devices and/or chips for rendering and displaying the image data.

Keeping the foregoing in mind, an XR system may project a generated image in association with a location of one or more virtual objects and/or one or more real objects. Indeed, the XR system may generate a two-dimensional or three-dimensional image for projection on or in association with real objects (e.g., AR system), virtual objects (e.g., VR system), or a combination of the real and virtual objects (e.g., MR system). When projecting the image, the XR system may project an image at a location relatively defined to a location of the one or more real objects and/or the one or more virtual objects. Thus, when the real objects or virtual objects, or both, move, the projected image is tracked with the real objects and/or virtual objects. The tracked projected image is perceivable to the user viewing the rendered images of the XR system without simultaneously being perceivable to a third-party viewing the real objects without the XR system.

Tracking a real object with a relatively fixed appearance in a real or virtual environment may be more straightforward than tracking an object that is changing. Difficulties in tracking a real object with a variable appearance may be exacerbated when tracking the real object while the real object is moving within the real environment. Even more so, it may be difficult to track an object that continues to display different images on its display. To overcome this difficulty, the XR system may track specific patterns on an electronic display of an electronic device being used to present a video stream.

As such, the present disclosure describes systems and methods for efficiently tracking an electronic display of an electronic device while the electronic display of the electronic device is presenting rapidly changing images, a video stream, or static images. Specifically, in addition to physical boundaries of the electronic device, an XR system may watch for and follow image frames of image data on the electronic display of the electronic device that include designated tracking data, expected static image frames, or expected defined image features in an image or video stream of the electronic device. The designated tracking data may be a watermark (e.g., watermark image), a pattern (e.g., patterned image, a high-contrast pattern, a black-white pattern, a multi-color pattern), or the like to be overlaid on an image frame to be presented. Image characteristics of the designated tracking data, and thus of the watermark or pattern, may be adjusted dynamically based on ambient brightness level, and thus may be presented differently when the electronic display is outside in a bright environment or inside in a dimmer environment. A static image frame may be an unchanging image presented on the electronic display. The defined image features may be selected subsets of an image frame within the image, such as a high-contrast region of an image frame, a high-contrast font, any font, any region of an image frame a threshold amount different from each other region of the image frame (e.g., 50%, 60%, 70%, or any difference in average brightness or average color value), a region of a large amount of color, or the like. The electronic device may transmit an indication to the XR system, or the XR system may already store an indication, of the defined image features or of the static image, to permit the XR system to readily track the electronic display.

Each of these methods (e.g., designated tracking data, static image frames, defined image features) may be thought of as creating or identifying a trackable feature on the electronic display. The XR system tracking the trackable feature of the electronic display may increase the accuracy of tracking the electronic display while reducing perceivable delays or errors associated with tracking the electronic display even when the electronic display presents image data. For ease of discussion, the term "tracked device" may refer to an electronic device (e.g., a handheld device) that presents the trackable feature on its electronic display and the term "tracking device" may be refer to an electronic device (e.g., an XR device) that tracks the trackable feature. The tracking device may also use the location of the tracked device to perform another operation. For example, the tracking device may use the location of the tracked device to render a three-dimensional image that interacts with the electronic display, the tracked device, or the trackable feature and/or that is located relative to the trackable feature (e.g., a defined distance from the trackable feature). In this way, the tracking device may be an XR system, or may be different suitable system, such as another electronic device running an extended reality (XR) application. The XR systems and application may be used as an entertainment system, but may also have a wide range of applicability in a variety of consumer and business products, such as healthcare, employee training, and the like. Thus, omission of specific discussion of these other use cases should not be construed as intentionally limiting or restrictive.

A signal may be transmitted from a first, tracked device to a second, tracking device (e.g., an XR system) to provide a warning for when the designated tracking data or defined image features are upcoming for display on the electronic display of the tracked device. In response to the signal, the tracking device may power on or increase power supplied to its camera subsystem and/or processing subsystem, as to prepare to capture an image of the tracked device's electronic display at a time that the designated tracking data or defined image features are presented. After capturing the image data, the tracking device may reduce power to or power off the camera subsystem and/or processing subsystem, which may reduce power consumption of the tracking device.

In some cases, the tracking device may adjust an amount of power supplied to the camera subsystem and/or processing subsystem in response to a duration of time passing from a previous tracking data presentation time, where the duration of time may be a mutually followed delay or trigger time by which both the tracked device and the tracking device are synchronized. In this way, a processor of the tracking device may, in response to a duration of time passing from a previous tracking data presentation time, increase an amount of power supplied to the camera subsystem, to a processing subsystem of the second electronic device, or both.

Furthermore, the tracking device may filter out designated tracking data from a captured video stream of the tracked device. Although the tracked device may display certain designated tracking data, which could be noticeable to a person looking at the display, the tracking device may filter out the tracking data when it is shown on a display of the tracking device. For example, a tracking pattern may appear in the real world on the electronic display of the tracked device. However, in an AR or MR environment generated by the tracking device, the tracking pattern may be filtered out and thus may not be visible on the tracked device in the virtual world.

Moreover, the tracking device may use motion sensing data from an inertial measurement unit (IMU) of the tracked device, its own IMU, or both to predict where within an image frame region captured by the camera of the tracking device that an electronic display of the tracked device is expected to appear at a future time. Predicting where the tracked device is expected to be at a future time may reduce the time involved in finding where the electronic display is located. For example, predicting which image frame region in which the electronic display of the tracked device will appear may reduce the time otherwise used for searching the entire image frame.

With this in mind, an electronic device 10 including a display 12 (e.g., display device) is shown in FIG. 1. As is described in more detail below, the electronic device 10 may be any suitable electronic device, such as a computer, a mobile phone, a portable media device, a tablet, a television, a virtual-reality headset (e.g., an extended reality headset), a vehicle dashboard, and the like. Thus, it should be noted that FIG. 1 is merely one example of a particular implementation and is intended to illustrate the types of components that may be present in an electronic device 10.

The display 12 may be any suitable electronic display. For example, the display 12 may include a self-emissive pixel array having an array of one or more self-emissive pixels. The display 12 may include any suitable circuitry to drive the self-emissive pixels, including for example row driver and/or column drivers (e.g., display drivers). Each of the self-emissive pixel may include any suitable light emitting element, such as a LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used.

In the depicted embodiment, the electronic device 10 includes the display 12, one or more input devices 14, one or more input/output (I/O) ports 16, a processor core complex 18 having one or more processor(s) or processor cores, local memory 20, a main memory storage device 22, a network interface 24, a power source 26 (e.g., power supply), and image processing circuitry 28. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. The image processing circuitry 28 (e.g., a graphics processing unit, an image signal processor, a display pipeline) may be included in the processor core complex 18.

The processor core complex 18 may execute instruction stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable logic arrays (FPGAs), or any combination thereof.

In addition to instructions, the local memory 20 and/or the main memory storage device 22 may store data to be processed by the processor core complex 18. Thus, the local memory 20 and/or the main memory storage device 22 may include one or more tangible, non-transitory, computer-readable mediums. For example, the local memory 20 may include random access memory (RAM) and the main memory storage device 22 may include read-only memory (ROM), rewritable non-volatile memory such as flash memory, hard drives, optical discs, and/or the like.

The network interface 24 may communicate data with another electronic device and/or a network. For example, the network interface 24 (e.g., a radio frequency system) may enable the electronic device 10 to communicatively couple to a personal area network (PAN), such as a Bluetooth network, a local area network (LAN), such as an 1622.11x Wi-Fi network, and/or a wide area network (WAN), such as a fourth generation (4G), fifth generation (5G), or Long-Term Evolution (LTE) cellular network.

The power source 26 may provide electrical power to one or more components in the electronic device 10, such as the processor core complex 18 and/or the display 12. Thus, the power source 26 may include any suitable source of energy, such as a rechargeable lithium polymer (Li-poly) battery and/or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device. The input device 14 may enable user interaction with the electronic device 10, for example, by receiving user inputs via a button, a keyboard, a mouse, a trackpad, and/or the like. The input device 14 may also include touch-sensing components in the display 12. The touch-sensing components may receive user inputs by detecting occurrence and/or position of an object touching the surface of the display 12.

In addition to enabling user inputs, the display 12 may include one or more display panels each having one or more display pixels. Each display panel may be a separate display device or one or more display panels may be combined into a same device. The display 12 may control light emission from the display pixels to present visual representations of information, such as a graphical user interface (GUI) of an operating system, an application interface, a still image, or video content, by displaying frames based on corresponding image data. The display 12 may display frames based on image data generated by the processor core complex 18 and/or the image processing circuitry 28. Additionally or alternatively, the display 12 may display frames based on image data received via the network interface 24, an input device 14, an I/O port 16, or the like.

Figure 2:
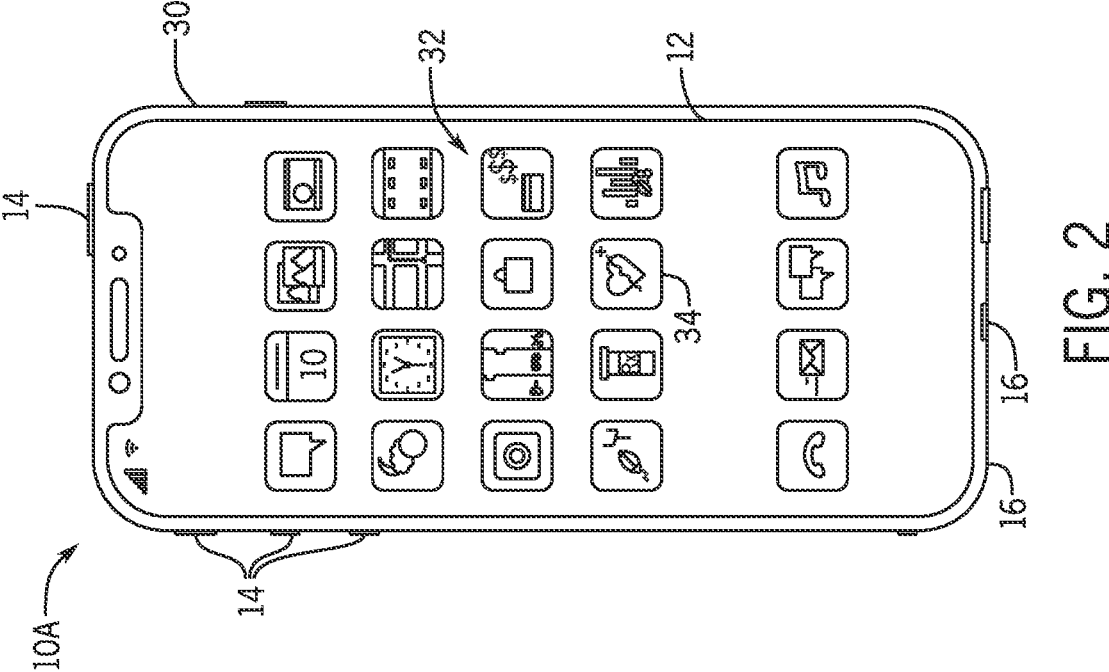
FIG. 2 is an example of the electronic device of FIG. 1, in accordance with an embodiment.

As described above, the electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, and/or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage and/or shield them from electromagnetic interference, such as by surrounding the display 12. The display 12 may display a graphical user interface (GUI) 32 having an array of icons. When an icon 34 is selected either by an input device 14 or a touch-sensing component of the display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 may be accessed through openings in the enclosure 30 and may include, for example, an audio jack to connect to external devices.

Figure 3:
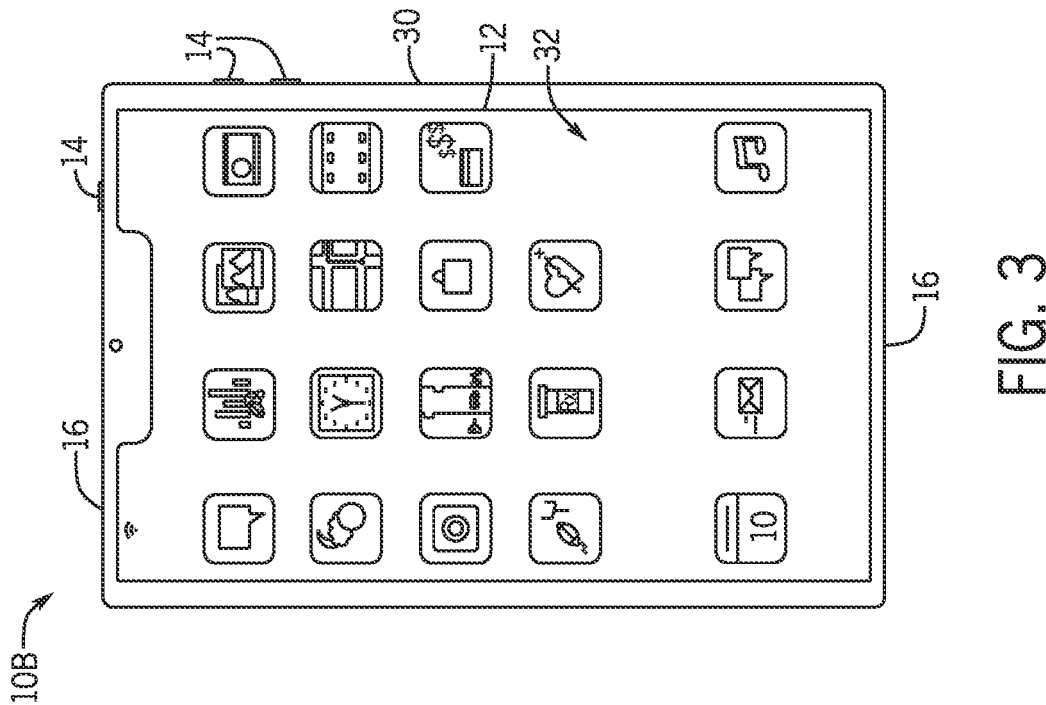
FIG. 3 is another example of the electronic device of FIG. 1, in accordance with an embodiment.
Figure 4:
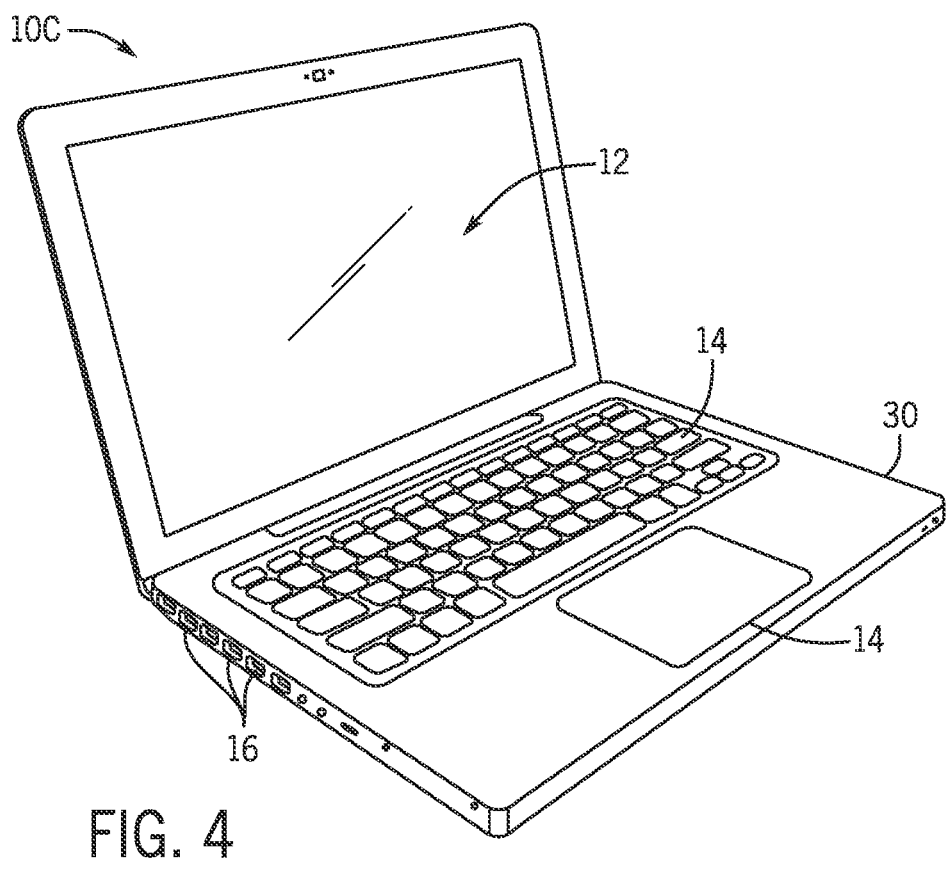
FIG. 4 is another example of the electronic device of FIG. 1, in accordance with an embodiment.
Figure 5:
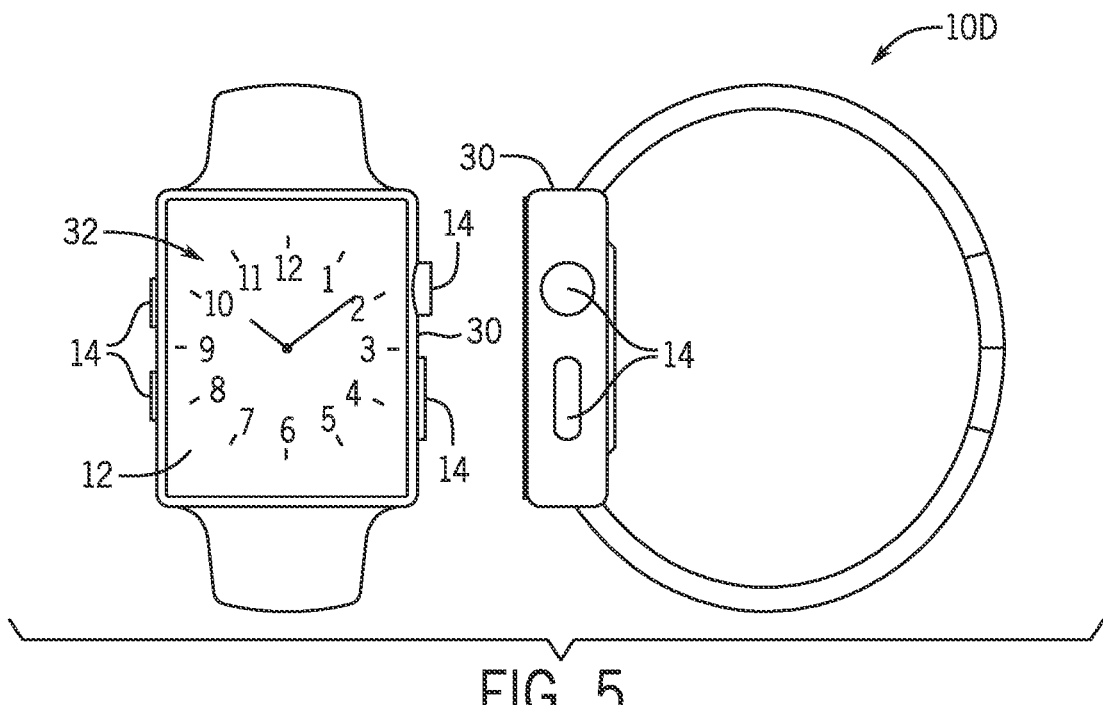
FIG. 5 is another example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MAC-BOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes a display 12, input devices 14, I/O ports 16, and an enclosure 30. The display 12 may display a GUI 32. Here, the GUI 32 shows a visualization of a clock. When the visualization is selected either by the input device 14 or a touch-sensing component of the display 12, an application program may launch, such as to transition the GUI 32 to presenting the icons 34 discussed in FIG. 2 and FIG. 3.

Figure 6:
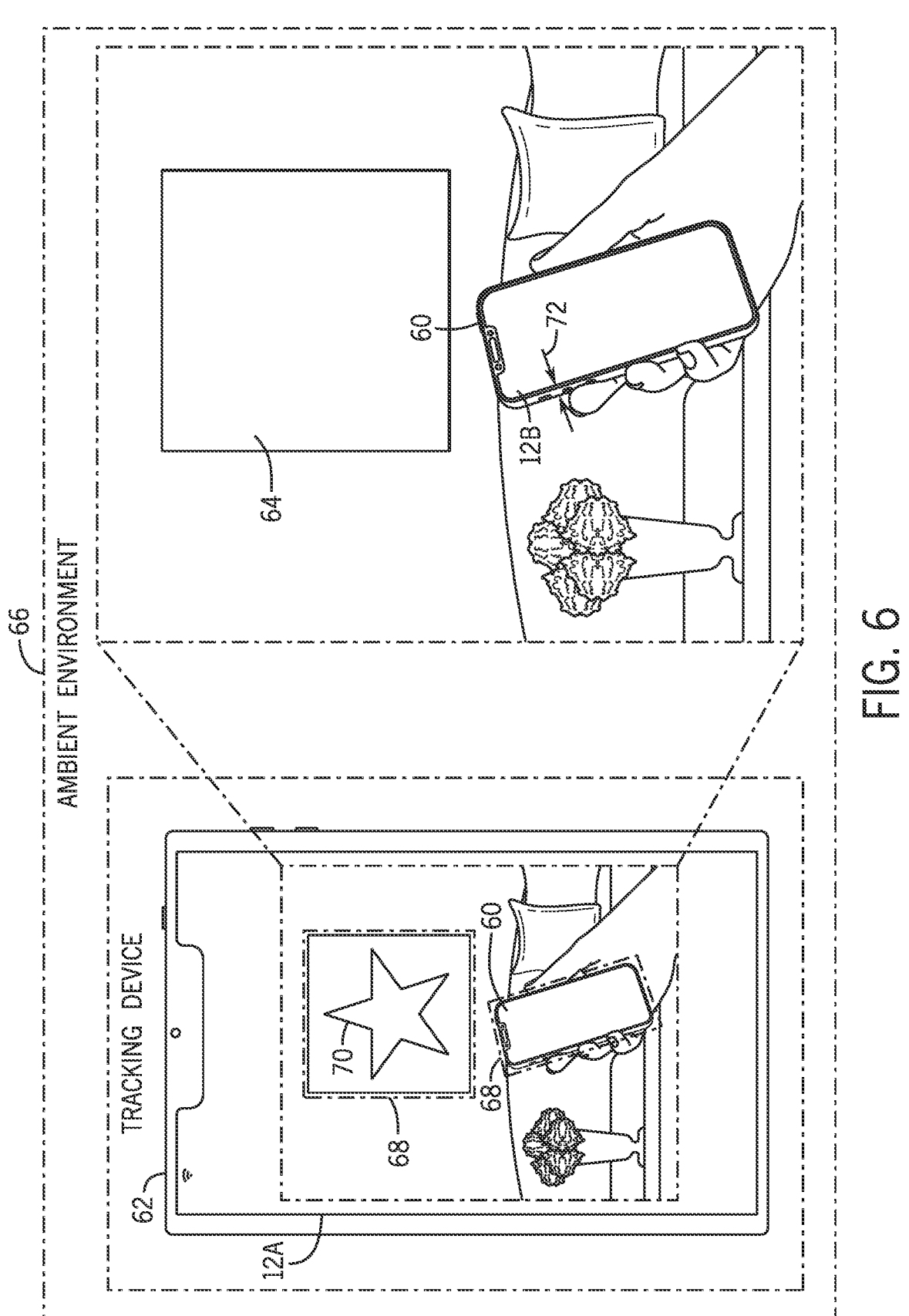
FIG. 6 is a diagrammatic representation of a tracking device tracking a tracked device, in accordance with an embodiment.

As described above, the display 12 may be tracked when a part of an extended reality (XR) system, such as to enable another electronic device to render on its display an image at a location associated with (e.g., proximate to, equal to, a threshold distance from) the location of the display 12 in an ambient environment. To elaborate, FIG. 6 is a diagrammatic representation of a tracked device 60 (e.g., a smartphone, as depicted in FIG. 6) being tracked by a tracking device 62 (e.g., a tablet, as depicted in FIG. 6). Both the tracked device 60 and the tracking device 62 are examples of the electronic device 10.

The tracking device 62 may track one or more tangible electronic devices, objects, people, or the like within a space captured by its camera subsystem. In the example of FIG. 6, the tracking device 62 tracks both the tracked device 60 and an object 64. The object 64 may have a fixed or stationary location (e.g., position, orientation, height) within the real, physical world (e.g., an ambient environment 66 surrounding the tracking device 62, the object 64, and the tracked device 60). The tracking is represented by dashed lines 68 around the rendered images of the tracked device 60 and the object 64 presented on a display 12A of the tracking device 62. It may be easier for the tracking device 62 to track the object 64 than to track the tracked device 60 since the object 64 is stationary and has wide distinct edges of the frame visible to processing circuitry of the tracking device 62. When tracking, the tracking device 62 may use a lock on the location of a target (e.g., target object, target person, target device) as a reference location to overlay or associate a generated three-dimensional or two-dimensional image. For example, the tracking device 62 overlays a generated star image 70 on captured images of the object 64 and the ambient environment 66 when tracking the object 64, and in an actual implementation any static or variable image or video stream may be overlaid as a mixed reality augmentation when tracking, including animations, special effects, inset images, data, text, shapes, or the like. In some embodiments, the static or variable image or video stream may be associated with an accompanying audible signal (e.g., a tone, chime or music) conveyed through the tracking device 62.

Tracking the object 64 may be less complex than tracking the tracked device 60. The tracking device 62 may track the object 64 by identifying a set of prominent features (e.g., edges, angles, colors) of the object 64 known a-priori by tracking device 62 within captured image data that includes a depiction of the object 64. By using cameras to look at the ambient environment 66, the tracking device 62 may identify such features and determine the location in the ambient environment 66 of the object 64, such as with respect to the tracking device 62 itself or another reference point or object. When this tracking operation is performed continuously, mixed reality augmentations will "stick" very smoothly on top or around the unchanging object 64 being tracked. For example, the star image 70 tracks the object 64 as the tracked device 60, the tracking device 62, or both move in space relative to the object 64. When the object 64 is tracked, the tracking device 62 generates the star image 70 to continuously overlay the image of the object 64 even while the image of object 64 moves due to the movement of the tracking device 62.

Keeping this in mind, the tracking device 62 may perform more complex operations to track the tracked device 60. Indeed, the tracked device 60 may present variable image data and have less prominent or fewer static features. Thus, the tracked device 60 may be more difficult to track when compared to tracking the object 64 that has static and prominent features. Indeed, static portions of the tracked device 60 may be limited to an outer physical edge 72 of the tracked device 60, which may be relatively thin when a display 12B is designed to take up the vast majority (e.g., 90%) of a front surface of the tracked device 60. Thus, it may be desirable for the tracking device 62 to use systems and methods that enable reliable tracking of a wide range of tracked devices 60 presenting a wide range of image data.

Figure 7:
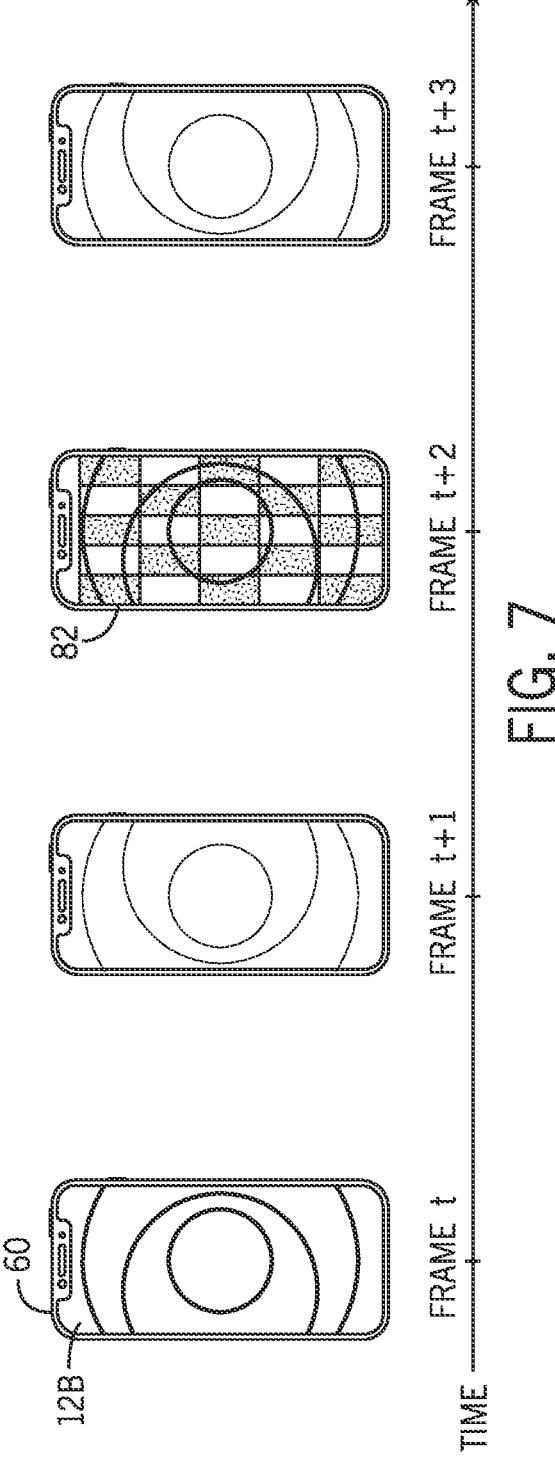
FIG. 7 is a diagrammatic representation of the tracked device of FIG. 6 presenting image frames via the display of FIG. 1 over time, in accordance with an embodiment.

In one such example, represented in FIG. 7, the tracking device 62 may watch for a reference image to be presented via the tracked device 60. The reference image may be known to the tracking device 62, and thus may be used as a static reference by which to determine a location of the tracked device 60 despite other changes in tracked device 60 location or the images presented.

To elaborate, FIG. 7 is a diagrammatic representation of the tracked device 60 presenting image frames via a display 12B over time. Although the image frames change over time, systems and methods described herein may also work with static image frames. Indeed, the tracking device 62 may monitor the tracked device 60 to watch for designated tracking data 82 to appear in captured image data of the ambient environment 66. The designated tracking data 82 may be a watermark, a pattern, or the like that may be overlaid during image processing operations on an image frame to be presented by the tracked device 60. In some cases, the designated tracking data 82 is any data known by the tracking device 62 emitted, conveyed, presented, or the like by the tracked device 60 as to beckon the tracking device 62 to its location and/or its screen location within a three-dimensional space. The tracking device 62 may use the designated tracking data 82 in captured image data to identify where within the captured image data that the display 12B is located, and thus where the image data corresponding to the tracked device 60 is within a dataset for the captured image data. Once the tracking device 62 localizes the tracked device 60 in the dataset, the tracking device 62 can localize the tracked device 60 in three-dimensional space (e.g., ambient environment 66), can convey audio-visual virtual content and/or augmentations around, on top of, and/or proximate to the tracked device 60 based on the mixed reality support from the tracking device 62 or another device, or other suitable processing operations that benefit from knowing the location of the tracked device (e.g., the screen of the tracked device).

Figure 8:
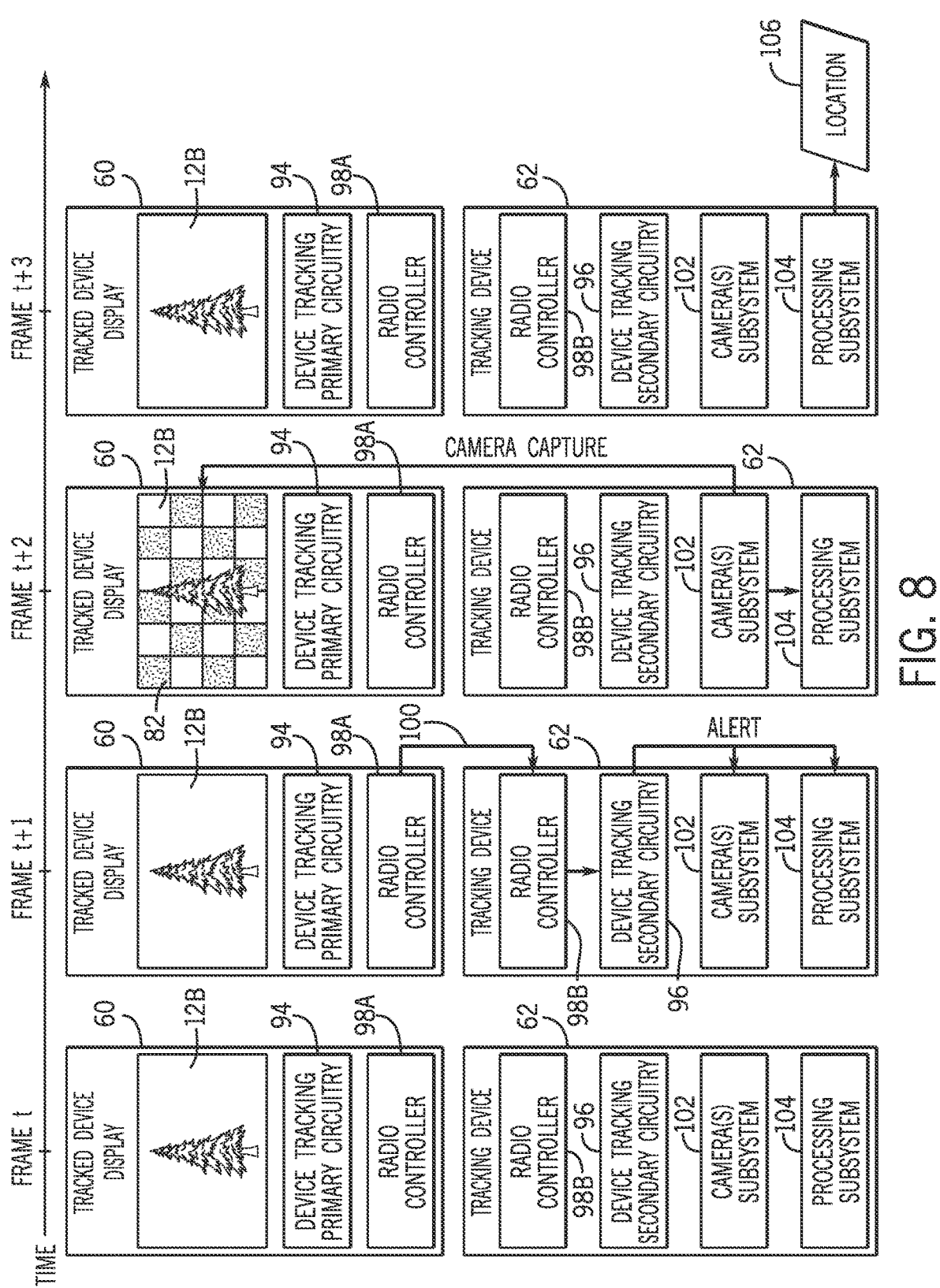
FIG. 8 is a diagrammatic representation of operations and block diagrams of the tracked device of FIG. 6 and the tracking device of FIG. 6 over time, in accordance with an embodiment.

Additional synchronization circuitry included in the tracked device 60 and the tracking device 62 may help perform these improved tracking operations, as FIG. 8 helps to illustrate. FIG. 8 is a diagrammatic representation of operations and block diagrams of the tracked device 60 and the tracking device 62 over several image frames (e.g., over time (t)). The tracked device 60 includes device tracking primary circuitry 94 and the tracking device 62 includes device tracking secondary circuitry 96. The device tracking primary circuitry 94 and the device tracking secondary circuitry 96 operate together as synchronization circuitry to align presentation of tracking data on the display 12B (e.g., on tracked device 60) with image capture operations of the tracking device 62.

The tracked device 60 also includes a radio controller 98A and the tracking device 62 includes a radio controller 98B. Each radio controller 98 may include a control system, and thus a processor (e.g., processor core complex 18) to execute instructions stored in memory (e.g., memory 20, storage devices 22) to perform operations, such as radio frequency communication transmission and control operations. Indeed, the radio controllers 98 may interface with the I/O ports 16, input devices 14, network interface 24, or the like of the other radio controller 98 to communicate data between the tracked device 60 and the tracking device 62. The radio controllers 98 may communicate using wireless or wired connections and signals.

At a first time and first frame (e.g., "Frame t"), the tracked device 60 presents image data on the display 12B according to previously received image data. While presenting a second frame (e.g., "Frame t+1") and thus at a second time, the device tracking primary circuitry 94 determined that a next frame is to include designated tracking data 82. In response to this determination, the device tracking primary circuitry 94 transmits a notification 100 signal to the tracking device 62 via the radio controllers 98. The notification 100 may be any suitable signal, including a pulse, a flag, a bit being set in a register, or the like. The tracking device 62 interprets the notification 100 signal as indicating that a next or incoming image frame includes designated tracking data 82 and proceeds to notify the device tracking secondary circuitry 96. The device tracking secondary circuitry 96 may generate a control signal to instruct the one or more cameras of a camera subsystem 102 and a processing subsystem 104 to make an image capture and process the image capture. In some embodiments, the one or more cameras of camera subsystem 102 may be in a low power or disabled state at or before the second time. The device tracking secondary circuitry 96 may, additionally or alternatively, generate a power control signal to instruct power management circuitry of the power source 26 to recouple or increase power supplied to the one or more cameras of a camera subsystem 102 and to a processing subsystem 104.

At a third time when a third frame (e.g., "Frame t+2") is presented, the tracking device 62 operates the camera subsystem 102 to capture image data of the display 12B, of the tracked device 60, and/or of the ambient environment 66. Thus, the camera subsystem 102 may capture an image of the tracked device 60 while it is displaying the designated tracking data 82. Captured image data may be transmitted from the camera subsystem 102 to the processing subsystem 104 as a dataset for processing to identify the designated tracking data 82 within the dataset. While the processing subsystem 104 processes the captured image data, the tracked device 60 may proceed to prepare to update the display 12B with a next image frame. In this case, the next image frame is a repeated image frame without the designated tracking data 82. The processing subsystem 104 may determine a location 106 of where the display 12B is located in the ambient environment before, at, or after the next image frame being presented at the fourth time.

The processing subsystem 104 may use the location to adjust virtual content in relation to the tracked device 60 via the display 12A. In some cases, the processing subsystem 104 may filter out the designated tracking data 82 from the image frames to be presented on the display 12A of the tracking device 62. Filtering out the designated tracking data 82 from the image frames to be presented on the display 12A of the tracking device 62 may reduce or eliminate a likelihood that the designated tracking data 82 is perceivable by a person viewing the display 12A of the tracking device 62.

In some embodiments, conveyance of designated tracking data 82 on display 12B of tracked device 60 may include obfuscation of some or all audio-visual content conveyed by tracked device 60. For example, after location 106 is determined by tracking device 62, tracked device 60 may enter a state where at least a portion of audio-visual information on tracked device 60 (e.g., on display 12B) ceases to be conveyed so that other users in ambient environment 66 cannot observe that portion of the audio-visual information. In this example, a full set of information on display 12B may not be visible without viewing display 12B through display 12A of tracking device 62. In some embodiments, tracked display 12B remains in an obfuscated state until tracking device 62 discontinues tracking tracked device 60. In some embodiments, tracked device 60 and/or display 12B transitions to a low power, inactive, sleep and/or other state where audio-visual information ceases to be conveyed on tracked device 60 (e.g., display 12B may turn off).

Figure 9:
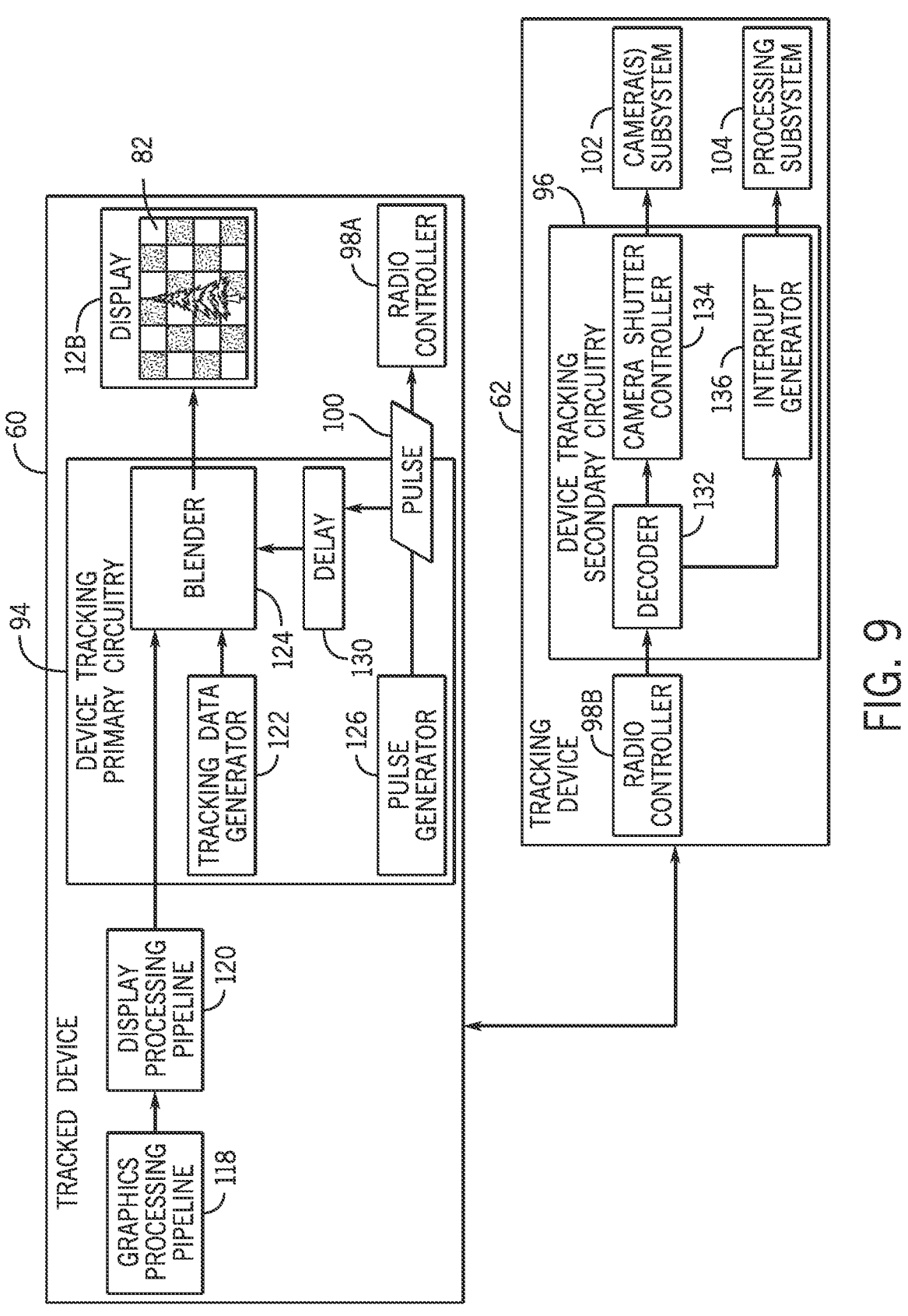
FIG. 9 is a block diagram of the tracked device of FIG. 6 and the tracking device of FIG. 6, in accordance with an embodiment.

Elaborating further on the device tracking primary circuitry 94 and device tracking secondary circuitry 96, FIG. 9 is a block diagram of the tracked device 60 and the tracking device 62. In addition to the blocks described in FIG. 8, the tracked device 60 may also include a graphics processing pipeline 118 and a display processing pipeline 120. The device tracking primary circuitry 94 may include a tracking data generator 122, blender 124, and a pulse generator 126. The pulse generator 126 may output a notification 100 to a delay block 130 and the radio controller 98A. Furthermore, in addition to the blocks described in FIG. 8, the tracking device 62 may also include a pulse decoder 132, a camera shutter controller 134, and an interrupt generator 136 as part of the device tracking secondary circuitry 96.

The tracked device 60 may generate image data for presentation via the display 12B using the graphics processing pipeline 118. The generated image data may be adjusted and prepared for presentation by the display processing pipeline 120. The display processing pipeline 120 may include one or more sequentially coupled circuits and/or sequentially performed operations to adjust one or more portions of the image data sequentially prior to output to the display 12B. For example, a first portion of the image data may be adjusted using a first operation. The second portion may be adjusted using the first operation afterward. While the second portion is being adjusted using the first operation, the first portion may be adjusted using a second operation.

The resulting processed image data may be output to the display 12B for presentation. When outputting image data to the display 12B, the image data may be transmitted through the device tracking primary circuitry 94. The blender 124 may blend the image data with other image data. Thus, in some cases, the blender 124 may pass on the image data without alteration. However, the blender 124 may, when instructed, blend (e.g., merge, combine) the image data with designated tracking data 82 generated by the tracking data generator 122. The designated tracking data 82 may be a watermark, a pattern, or the like. Some watermarks may be a partially transparent image, text, or shape overlay to the image frame that may be visible or imperceptible to a person. The pattern may be a repeated watermark or shape. The designated tracking data 82 may be formed using data that, when combined with the image frame (e.g., a data masking matrix), adjusts a brightness level of the portion of the image data present at a relative location of the image frame corresponding to where the pattern is to be located. In some cases, the pattern may be a high contrast pattern that follows a desirable ratio between shades of colors or characteristics of light used as the pattern (e.g., 3:1 color value ratio, 4:1 brightness of color ratio). When a high contrast pattern, the designated tracking data 82 may override a portion of the image frame that it is overlaid on, and thus may be an image mask that brings a value of the image data for that portion of the image frame to an absolute lowest brightness level (e.g., 0 percent (%) brightness) or to an absolute highest brightness level (e.g., 100% brightness). Indeed, the pattern may be a black-white pattern or may include one or more colors in the pattern.

A pulse generator 126 may track when the designated tracking data 82 is to be presented on the display 12B. When the presentation time is upcoming (e.g., one or more image frames in the future), tracked using a clock, a counter, an interrupt from the tracking data generator 122, or the like, the pulse generator 126 may generate a notification 100 signal transmitted to the blender 124 via delay block 130 and to the radio controller 98A. The delay block 130 may introduce a delay to the transmission of the notification 100 signal equal or substantially similar to a duration of time that the tracking device 62 uses to receive the notification 100 signal, to power on the camera subsystem 102 and/or the processing subsystem 104, and the like to become ready to capture an image of the display 12B. Delaying the notification 100 signal may help align the presentation of the designated tracking data 82 and the image capture operations of the tracking device 62. In response to receiving the delayed notification 100 signal from the delay block 130, the blender 124 may combine the generated tracking data and the image frame data to prepare to present the image frame with the designated tracking data 82.

To prepare to capture the image of the display 12B, the tracking device 62 may, in response to receiving the notification 100 signal at the radio controller 98B, decode the notification 100 signal at the pulse decoder 132 when the notification 100 signal was encoded prior to transmission between the radio controllers 98. After decoding, the tracking device 62 may transmit the notification 100 signal to the camera shutter controller 134 and the interrupt generator 136. In response to receiving the notification 100 signal, the camera shutter controller 134 may return or increase a supplied power to the camera subsystem 102 and/or instruct the camera subsystem 102 to capture an image that includes the display 12B. Images captured of the tracked device 60 may span one or more image frames. Furthermore, in response to receiving the notification 100 signal, the interrupt generator 136 may generate an interrupt command that instructs the processing subsystem 104 to pause or stop a pending or ongoing operation of the processing subsystem 104 and to prepare to receive and process the captured image data from the camera subsystem 102.

Sometimes the notification 100 signal may include a timestamp from the tracked device 60 that indicates a time at which the notification 100 signal was generated. The tracking device 62 may reference the timestamp and adjust when it operates the camera shutter controller 134 to compensate for transmission delays incurred when transmitting the notification 100 signal. Furthermore, the notification 100 signal may indicate a future time or set of times during which the tracking device 62 is to operate the camera.

Figure 10:
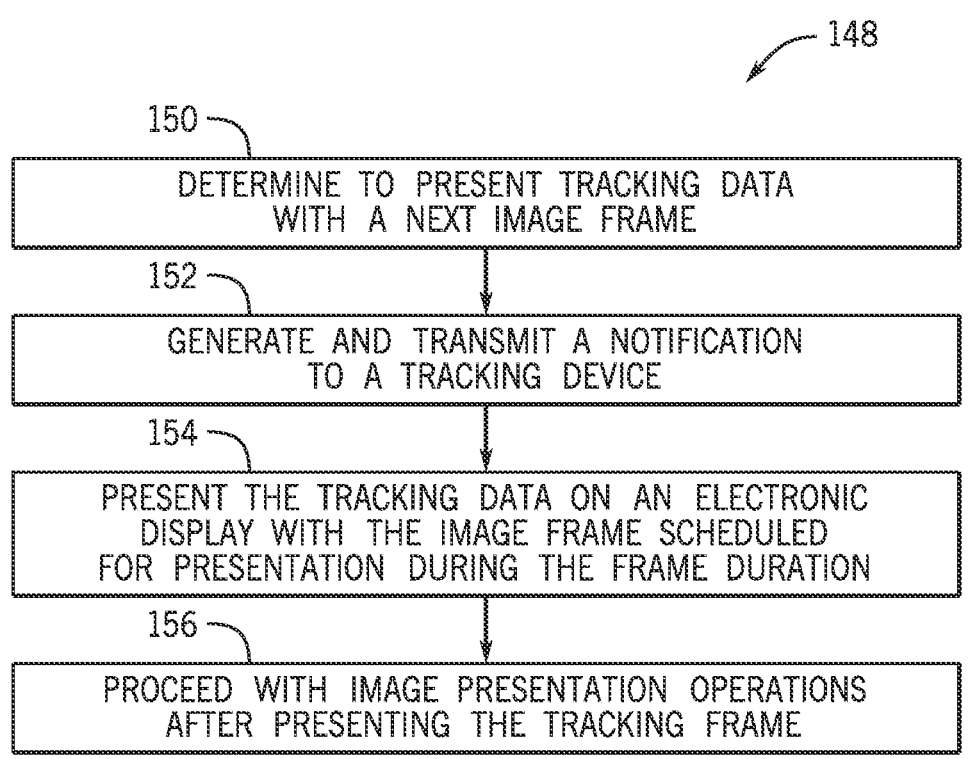
FIG. 10 is a flow diagram of a process for operating the tracked device of FIG. 6 during a tracking operation corresponding to the tracking device of FIG. 6, in accordance with an embodiment.

FIGS. 10 and 11 further describe the operations of FIGS. 8 and 9. FIG. 10 is a flow diagram of a process 148 for operating the tracked device 60 during a tracking operation corresponding to the tracking device 62. The process 148 may be performed by a controller of the processor core complex 18 of the tracked device 60, such as a display pipeline controller of the display processing pipeline 120, a controller of the graphics processing pipeline 118, or the like, in response to executing instructions stored in a tangible, non-transitory, computer-readable medium, such as the local memory 20, the main memory storage device 22, or the like of the tracked device 60. For ease of description, the process 148 is described as performed by the tracked device 60 as a whole. Moreover, the operations of the process 148 are shown in a particular order; however, some of the operations may be performed in a different order than what is presented.

At block 150, the tracked device 60 may determine to present tracking data in a next image frame. The next image frame may include image data from the display processing pipeline 120 that is provided to the blender 124. The tracking data generator 122 may generate the tracking data. The next image frame may be the immediately next frame to be displayed on the electronic display of the tracked device 60 or a next image frame in a queue of image frames for subsequent presentation. The tracked device 60 may determine when to present the tracking data based on an interrupt being generated, a tracked duration of time expiring, such as from a counter counting up or down to a particular value or a timer expiring. In some examples, the tracked device 60 may monitor for an indication saved into a register to determine when to transmit tracking data to the blender 124. This may separate the acts of generating the tracking data and generating the image data. That is, other graphics or image data processing circuitry of the tracked device (e.g., a GPU, a display pipeline, an image signal processor, or the like) may be agnostic as to the tracking data. In other examples, however, generating image data that includes the tracking data may be an operation of the graphics or image data processing circuitry of the tracked device (e.g., a GPU, a display pipeline, an image signal processor, or the like).

In response to determining to present the tracking data in the next image frame, the tracked device 60 may generate and transmit the notification 100 signal to the tracking device 62. After waiting a duration of time (e.g., a duration of time set by the delay block 130), the tracked device 60 may present the tracking data on the display 12B with the image frame to be presented. As a reminder, the tracking data is combined with the image data of the image frame to form the designated tracking data 82 when presented via the display 12B. By presenting the tracking data, the tracked device 60 may provide the tracking data to the tracking device 62 via the display 12B. After the designated tracking data 82 was presented on the display 12B, at block 156, the tracked device 60 may proceed with subsequent image presentation operations.

The tracked device 60 may present the designated tracking data 82 for one or more image frame durations. To do so, the tracked device 60 may either continue to present the same image data, refreshing as desired. Sometimes the tracked device 60 may continue to blend incoming image frames with the generated tracking data from the tracking data generator 122 at the blender 124 for the subsequent image frames.

Considering now operations performed by the tracking device 62, FIG. 11 is a flow diagram of a process 168 for operating the tracking device 62 during a tracking operation to track the tracked device 60. The operations of the process 168 may be performed at least partially in parallel to some of the operations of process 148 of FIG. 10. The process 168 may be performed by a controller of the processor core complex 18 of the tracking device 62, such as the device tracking secondary circuitry 96, a controller associated with the processing subsystem 104 that is not power gated with the processing subsystem 104, or the like, in response to executing instructions stored in a tangible, non-transitory, computer-readable medium, such as the local memory 20, the main memory storage device 22, or the like of the tracking device 62. For ease of description, the process 168 is described as performed by the tracked device 60 as a whole. The operations of the process 168 are shown in a particular order; however, some of the operations may be performed in a different order than what is presented.

At block 170, the tracking device 62 may receive the notification 100 signal from the tracked device 60, and the notification 100 signal may indicate that an incoming image frame has the designated tracking data 82. In response to the notification 100 signal, at block 172, the tracking device 62 may increase a power supplied to the camera subsystem 102 and/or the processing subsystem 104. The camera subsystem 102 and/or the processing subsystem 104 may be reduced to different voltage or current supply levels when idle and thus may be brought online or powered on again using different voltages or current differentials relative to each other in response to the notification 100 signal. By presenting the tracking data, the tracked device 60 may provide the tracking data for reception by the tracking device 62 via the display 12B. In some cases, the tracked device 60 may provide an indication of the tracking data 82 to the tracking device 62 via the notification 100 signal. The tracking device 62 may store an indication of the tracking data in its memory 20 and may use the indication to identify where within a dataset the tracking data is located.

Once powered on, at block 174, the tracking device 62 may instruct the camera subsystem 102 to take an image capture (e.g., perform image capturing operations) a duration of time after receiving the pulse. The duration of time may correspond to a length of time that the delay block 130 delays the notification 100 signal. Sometimes, the tracking device 62 may adjust when the camera subsystem 102 is instructed to perform an image capture based on a timestamp included in the notification 100 signal. Indeed, the tracking device 62 may compensate for transmission delays determinable by comparing a time of reception to the timestamp of the notification 100 signal. The notification 100 signal may indicate a specific time at which the camera subsystem 102 is to be operated to capture an image of the tracked device 60, which may happen when, for example, the tracked device 60 presents images at variable refresh rates otherwise unknown to the tracking device 62. In any of these cases, the camera subsystem 102 captures an image of the display 12B displaying the designated tracking data 82 in response to the instruction.

After capturing the image data, at block 176, the tracking device 62 may determine a position of the display 12B of the tracked device 60 based on the captured image data including the designated tracking data 82. Since the designated tracking data 82 is a displayed marker known by tracking device 62 and seen by cameras of the tracking device 62, the tracking device 62 may identify the designated tracking data 82 in the captured image data and may correlate the location of the designated tracking data 82 in the space of the ambient environment 66 to being the location of the display 12B and the location of the tracked device 60. For example, the tracking device 62 may compare an indication of the designated tracking data 82 to the image data captured of the display 12B to identify a location of the designated tracking data 82 in the captured image data. Being known and pre-defined, visual features of the designated tracking data 82 are also known by the tracking device 62, and thus such a known marker may be used to track the tracked device 60 even when custom and dynamically changing image content is being displayed. Furthermore, the designated tracking data 82 may be overlaid for one or more frames, where a single frame lasts a relatively short, imperceptible amount of time (e.g., 8.33 milliseconds (ms) of time for a frame presented at a 120 frames-per-second (fps) refresh rate). Moreover, the designated tracking data 82 may be even less noticeable by a person given the blending operations of the blender 124 further disguising the designated tracking data 82 as the known marker within the image content.

At block 178, the tracking device 62 may generate an image data modification based on the location, may perform an operation based on the location, or both. Indeed, after identifying the designated tracking data 82 in the captured image data, the tracking device 62 may adjust its operations based on the location of the display 12B, such as to notify a person to return within programmatically monitored boundaries of the ambient environment 66 (e.g., an alert to notify the user "please return to the play area of this virtual world") and/or to generate image data to overlay on the captured image data, such as to manipulate space surrounding the tracked device 60 for the amusement of a viewer or to otherwise convey information.

The above descriptions focus on using the designated tracking data 82 as the known marker. However, these systems and methods may also work with using, as the known marker, a static image frame, or defined image features in presented images.

Figure 12:
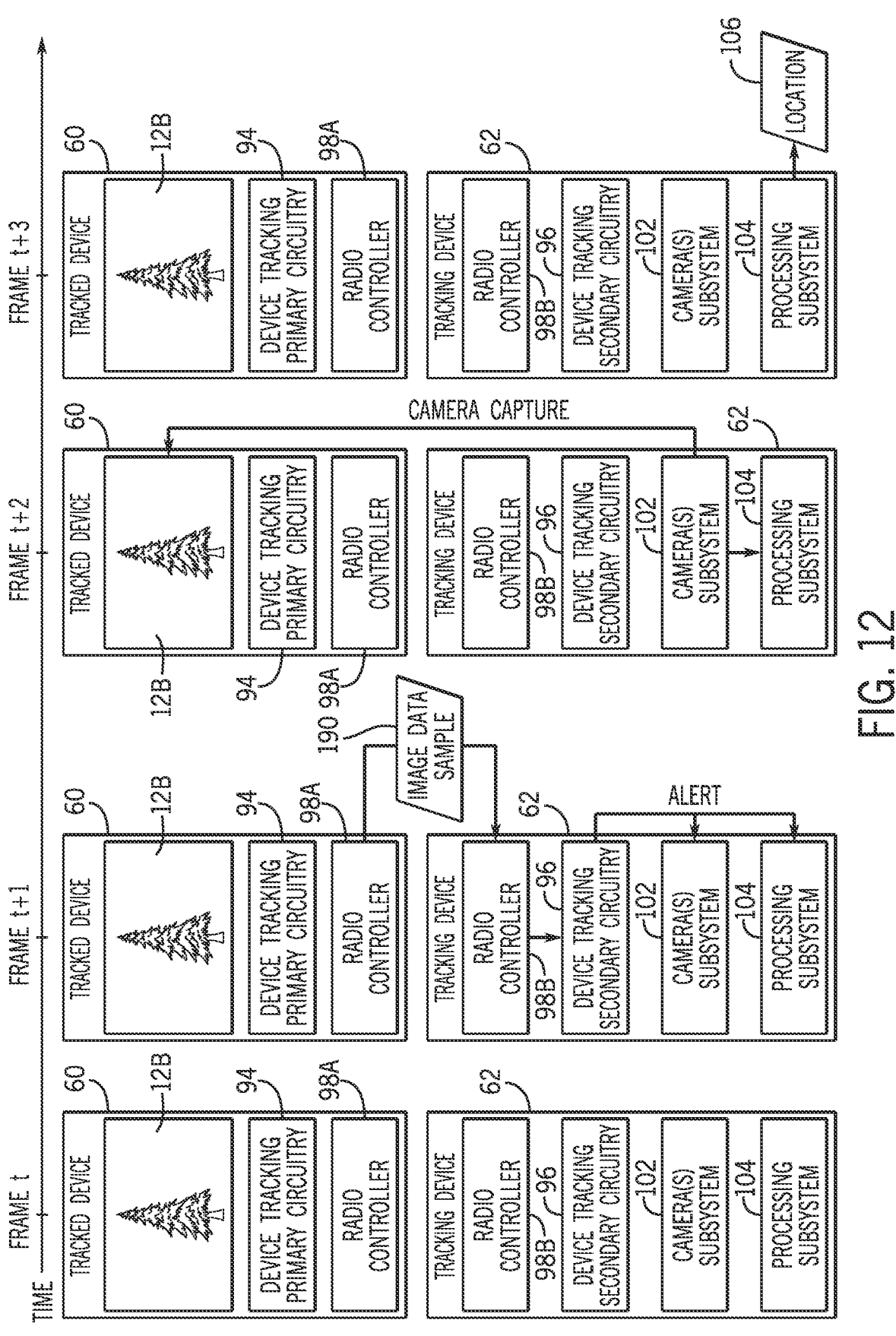
FIG. 12 is a diagrammatic representation of the tracked device of FIG. 6 and the tracking device of FIG. 6 exchanging an image data sample, in accordance with an embodiment.

Indeed, FIG. 12 is a diagrammatic representation of the tracked device 60 transmitting an image data sample 190 to the tracking device 62 additionally or alternatively to the notification 100 signal. The tracked device 60 may use the image data sample 190 similar to the notification 100 signal, and thus the transmission of either may notify the tracking device 62 of an incoming image frame to trigger bringing the tracking device 62 out of a reduced power operational mode. For components in FIGS. 12-15 that have been described above, earlier descriptions apply.

To alert the tracking device 62 of an incoming known marker, the tracked device 60 may transmit the image data sample 190. After receiving the image data sample 190, the tracking device 62 may perform operations of blocks 172-178 of FIG. 11. These operations may include increasing power supplied to idle circuitry (e.g., camera subsystem 102, processing subsystem 104) to prepare to capture an image of the display 12B and analyzing the captured image data to identify the location based on the known marker.

The image data sample 190 may include an indication of an upcoming image frame that the tracking device 62 is about to present as a known marker, such as a whole image frame, a partial image frame, or extracted portions of an image frame that may be identifiable when processing the image data. The image data sample 190 may indicate extracted visual features to the tracking device 62 to use when identifying the location of the display 12B. Indeed, the tracked device 60 may transmit an indication of a static image frame as the image data sample 190 and/or an indication of defined image features in images presented or to be presented, which may include a region of color or brightness contrast in the image frame, a text, a shape, or any graphical feature relatively prominent in an presented image. The tracking device 62 may output the location 106 of the tracked device after performing operations of block 176 and may use the location 106 in other operations at block 178.

Figure 13:
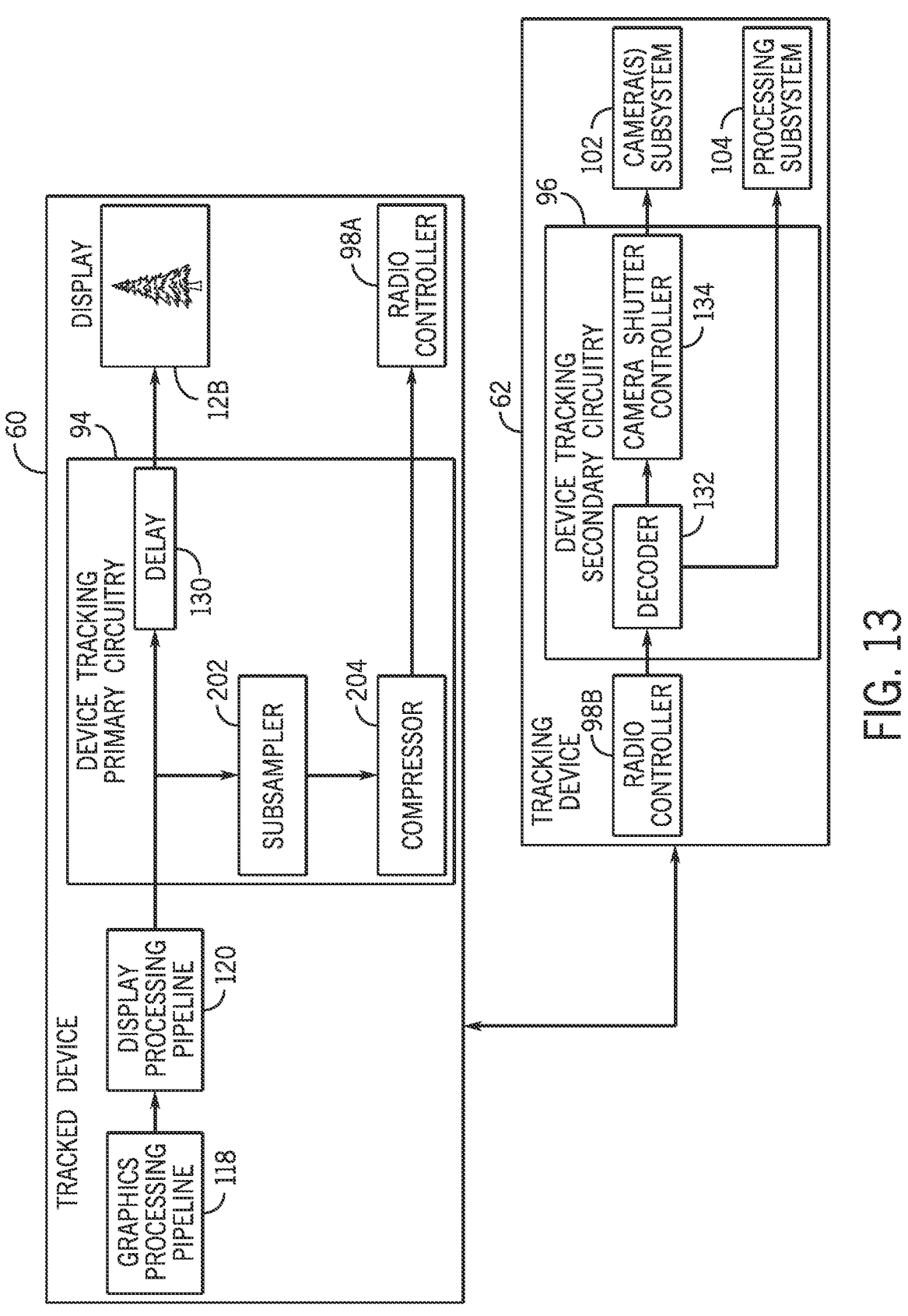
FIG. 13 is a block diagram of the tracking device of FIG. 6 and of the tracked device of FIG. 6, which includes a subsampler, in accordance with an embodiment.

To use the image data sample 190 as the known marker, circuitry and/or operations performed by each of the device tracking primary circuitry 94 and the device tracking secondary circuitry 96 may change. For example, FIG. 13 is a block diagram of the tracked device 60 using a subsampler 202 to intersect and sample a subset of image data, or image data for a whole image frame, being transmitted from the display processing pipeline 120 (e.g., the image data sample 190). The sample of the image data may be transmitted to the tracking device 62 to enable the tracking device 62 to superimpose the sample of the image data over the captured image data as a way to hide tracking data of the display 12B from being presented to the user. In some cases, however, the sample of the image data may be used as a known marker of image data for the tracking device 62 to use when identifying the location of the display 12B. The subsampler 202 may transmit the image data sample 190 to a compressor 204. When used, the compressor 204 compresses the image data sample 190 before its transmission to the tracking device 62 as the known marker. The compressor 204 may use any suitable method, such as inter-frame coding (e.g., encoding or decoding first image data based on values of second image data to reduce data handled when duplicated), intra-frame coding (e.g., encoding or decoding first image data based on values of the first image data to reduce data handled when duplicated), lossy compression, lossless compression, or the like.

Figure 14:
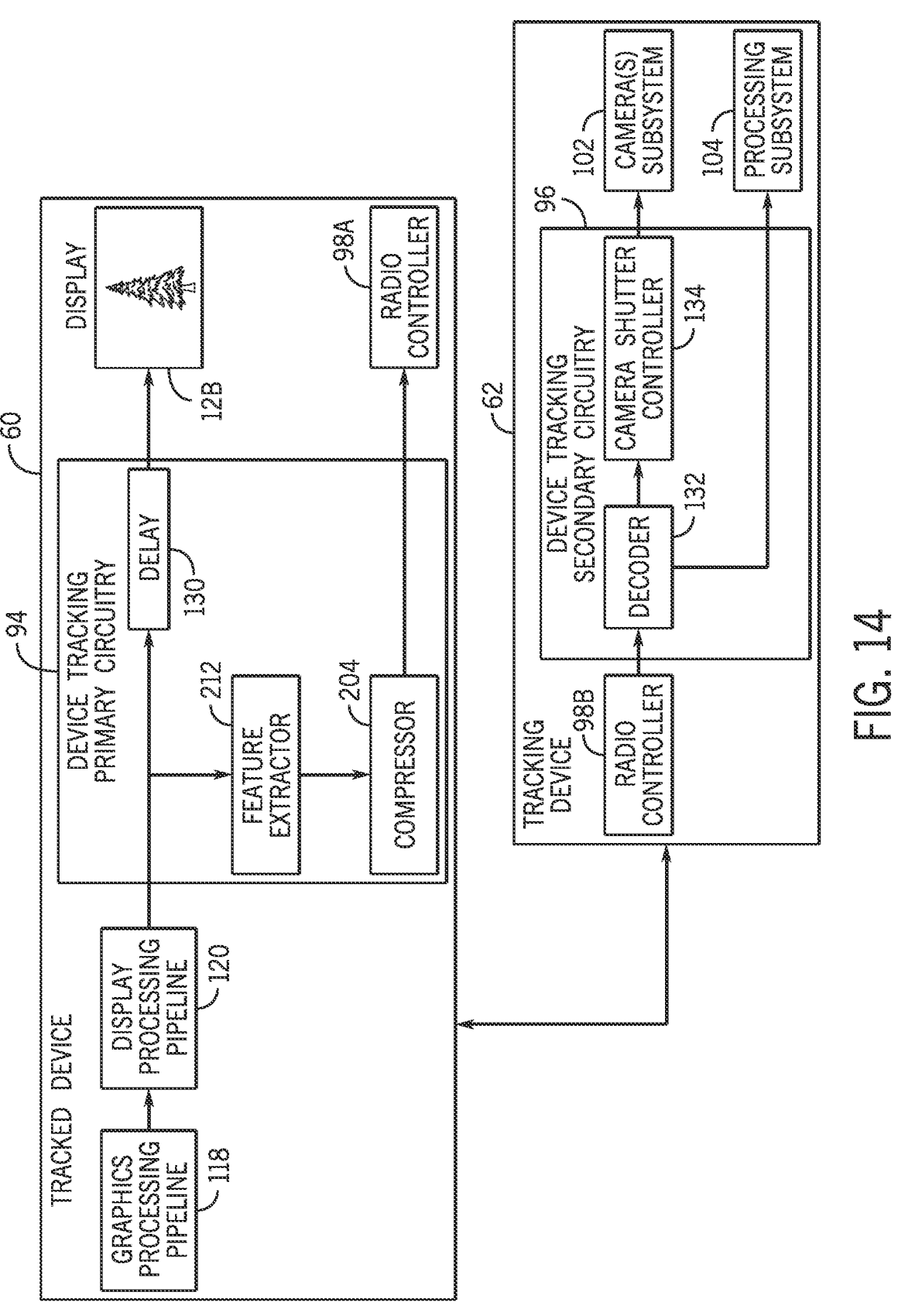
FIG. 14 is a block diagram of the tracking device of FIG. 6 and of the tracked device of FIG. 6, which includes a feature extractor, in accordance with an embodiment.

In another example, the image data sample 190 may include extracted image features for the tracking device 62 to use as a known marker when searching the captured image data for the display 12B. Indeed, FIG. 14 is a block diagram of the tracked device 60 using a feature extractor 212 to intersect and sample a subset of image data, or image data for a whole image frame, being transmitted from the display processing pipeline 120 for identification as a known marker of image data for the tracking device 62. The feature extractor 212 may extract one or more image features, or subsets of image data, from the image data sample 190. For example, the feature extractor 212 may determine the image features to be extracted based on relative contrast values between different portions of the image data, text to be presented in the image frame, or the like, to identify relatively clear features readily identifiable in the captured image data of the presented image frame. Once extracted, the compressor 204 receives the extracted data from the feature extractor 212 and compresses the extracted data for transmission to the tracking device 62.

Both FIG. 13 and FIG. 14 show that the tracked device 60 to include the delay block 130 coupled to the display 12B. In these other cases, the delay block 130 may be programmed to have a same delay as in FIG. 9 since the delay being compensated for includes a power on delay time associated with bringing components of the tracking device 62 back online after being powered off or in a reduced power state when idle. The delay block 130 may add time to a total transmission time of the image data to the display 12B, such as to display drivers or control circuitry of the display 12B, without adding additional the image data sample 190 beyond transmission and processing delays. Delaying outputs from the display processing pipeline 120 may synchronize the image presentation and the image capture operations.

Figure 15:
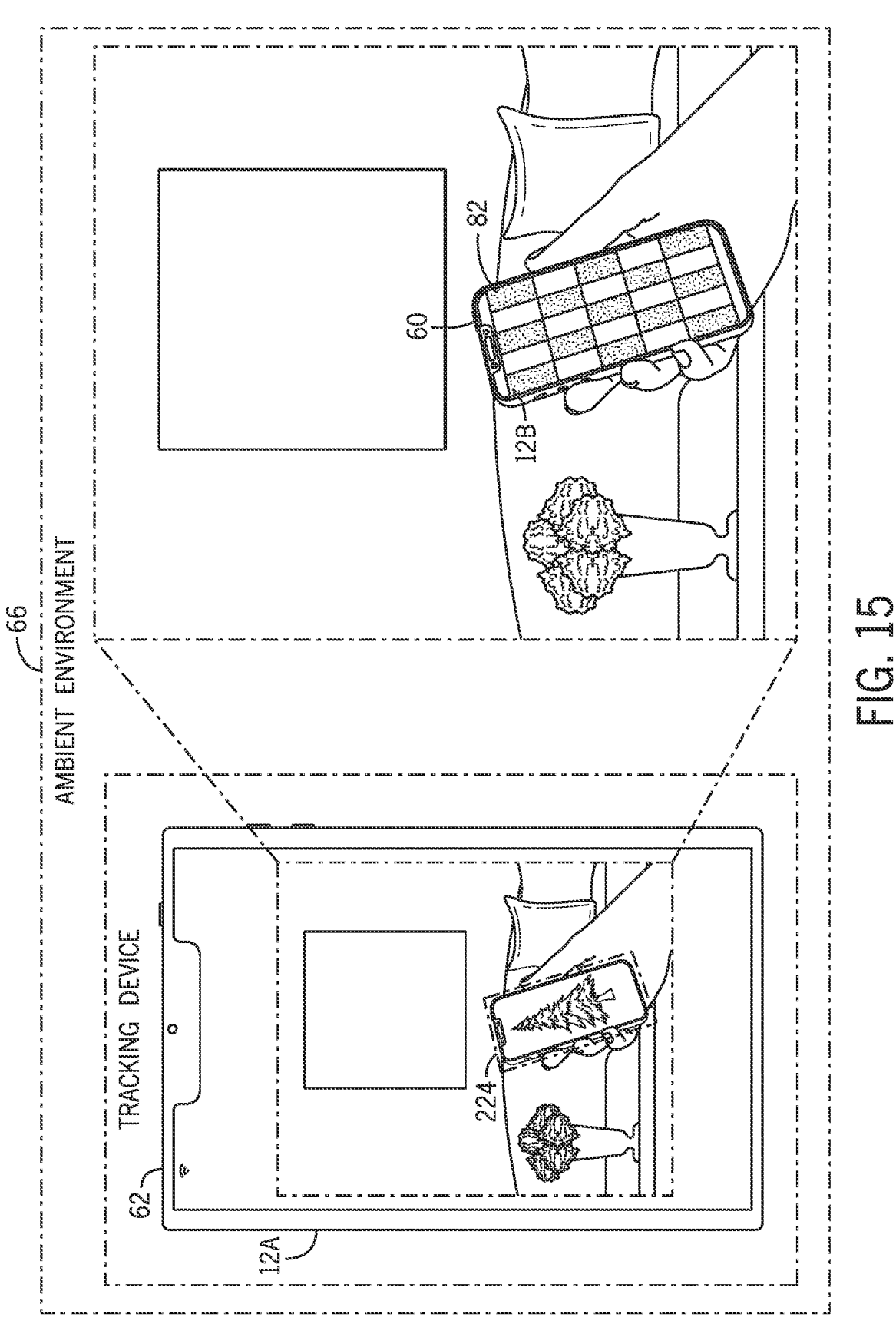
FIG. 15 is a diagrammatic representation of the tracking device of FIG. 6 superimposing or overlaying image data generated by its own image processing circuitry on captured image data that depicts the tracked device of FIG. 6, in accordance with an embodiment.

In some cases, the tracking device 62 generates image data to superimpose on a portion of captured image data (e.g., captured image data depicting when presented the ambient environment and any devices or objects included within). FIG. 15 is a diagrammatic representation of the tracking device 62 superimposing or overlaying image 224 data generated by its own image processing circuitry on captured image data depicting the tracked device 60 when presented via the display 12A. Indeed, the tracking device 62 may generate image frames for conversion into image data and may combine the generated image data with the captured image data. The tracking device 62 may combine the two datasets such that the generated image data is superimposed on the captured image data at a location in the dataset of designated tracking data 82 determined to correspond to the location of the display 12B. Thus, to do so, as is generally described above, the tracking device 62 searches the captured image data to identify where in the dataset the designated tracking data 82 is found, such as by using any suitable image processing comparison operation). Once the location within the dataset is identified, the tracking device 62 performs combining operations, such as image data masking operations that use matrices to replace matrix values with new data, to replace the captured image data with the generated image data at the location within the dataset. Thus, when the combined data is presented on the display 12A, an image 224 generated of the tracked device 60 may omit an image of designated tracking data 82 even when the tracked device 60 itself is continuing to present the designated tracking data 82. In these cases, the tracked device 60 may continue presenting the designated tracking data 82 without concern of how noticeable the designated tracking data 82 is to a user of the tracking device 62, since the image 224 presented to the user of the tracked device 60 is filtered or adjusted to omit the designated tracking data 82.

These systems and methods support the designated tracking data 82 being presented for more or less than an image frame time duration. The delay block 130 may be calibrated accordingly to provide a suitable amount of delay. The designated tracking data 82 presentation duration may also be considered a presentation variable to adjust an appearance of the designated tracking data 82. Furthermore, the designated tracking data 82 may be adjusted dynamically based on ambient brightness level, and thus may be presented differently when the display 12B is outside or is inside. For example, the tracked device 60 may adjust the designated tracking data 82 to be presented using higher contrast colors or using brighter color values based on a sensed ambient brightness level of the ambient environment 66 (e.g., ambient environmental conditions), such as by adjusting an overall screen brightness value or adjusting the image data used as the designated tracking data.

Figure 16:
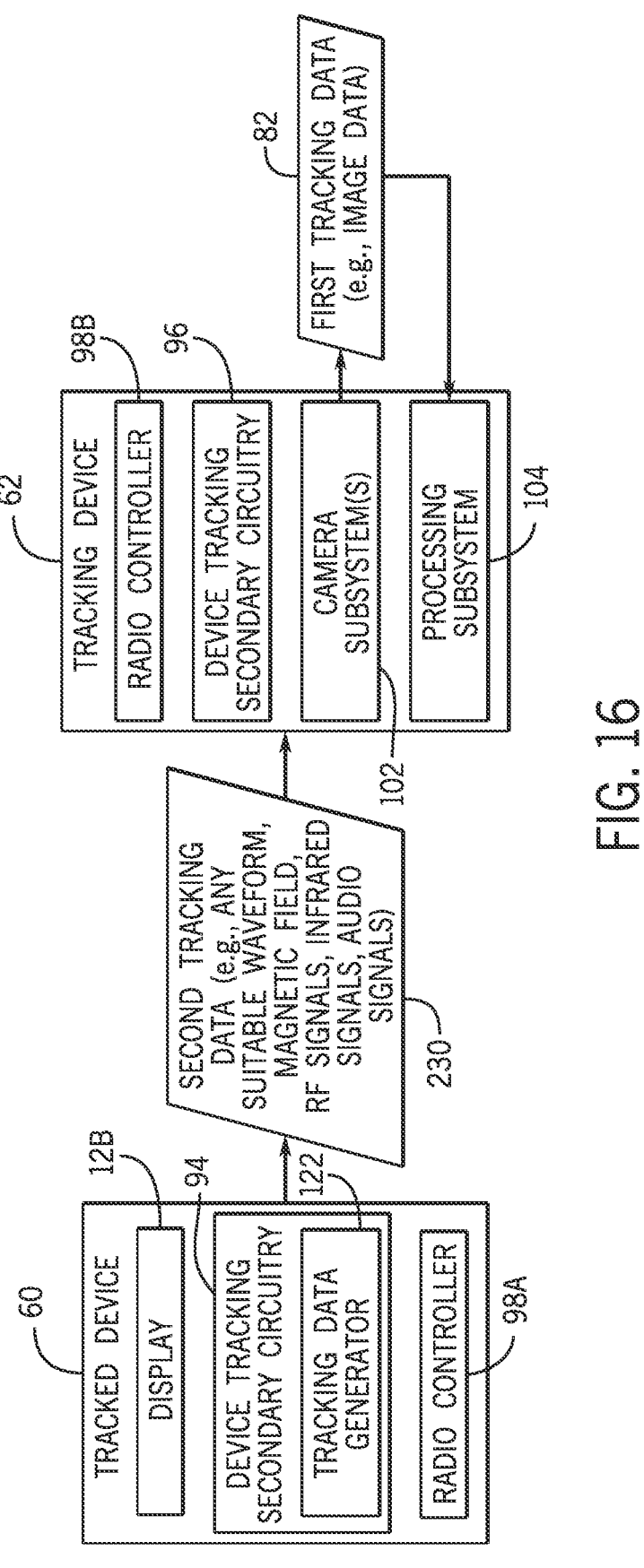
FIG. 16 is a block diagram of a tracked device and a tracking device that exchange first and second tracking data, in accordance with an embodiment.

Keeping the foregoing in mind, some systems may use secondary or second tracking data to validate, in place of, or with the tracking data 82. FIG. 16 is a block diagram of the tracked device 60 that generates both first tracking data 82 for presentation via the display 12B (e.g., that is received by tracking device 62 via image capture of the display 12B by the camera subsystem 102) and second tracking data 230 for transmission to the tracking device 62. The second tracking data 230 may include any suitable electromagnetic or radio frequency (RF) waveform, a magnetic field, infrared signals, audio signals, or the like. Although this example uses the tracking data 82 as first tracking data 82, it should be understood that any combination of tracking data described as the second tracking data 230 may be used in combination of another type of tracking data described. For example, an audio signal may be used with an infrared signal as the two types of tracking data used to locate the tracked device 60.

As discussed above, the tracked device 60 may present the tracking data 82 alone or with image data of a presented image frame, and the tracking device 62 may take an image capture to obtain image data that includes the tracking data 82. Image data from the image capture of the display 12 is generated by the camera subsystem 102 and transmitted to the processing subsystem 104 for processing.

The tracked device 60 may also generate second tracking data 230 (e.g., secondary tracking data). The tracking device 62 may use the second tracking data 230 to validate a location of the tracked device 60 determined based on the first tracking data 82. The tracking device 62 may sometimes use the second tracking data 230 to determine the location of the tracked device 60 without using the first tracking data 82.

In some cases, the tracking device 62 may toggle between operational modes, where each operational mode may use a different of the tracking data. For example, the tracking device 62 may operate in two or more operational modes. A first operational mode may cause the tracking device 62 to track the tracked device 60 using the first tracking data 82 and a second operational mode may cause the tracking device 62 to track the tracked device 60 using the second tracking data 230. As later described in FIG. 17, the operational modes may be used to operate the tracking device 62 in and out of a relatively lower power consumption operational mode since tracking using the second tracking data 230 may use fewer processing resources than tracking using the first tracking data 82. Toggling operation of the tracking device 62 between the different operational modes may improve device operation by reducing overall power consumption and permitting a controller to tailor the operation of the tracking device 62 to the current operational demands of the tracking circumstances. For example, the tracking device 62 may be operated to use a less accurate, lower power tracking mode when the tracked device 60 is static (e.g., indicated by motion data, position data, or orientation data) or relatively easy to track, but may be operated to use a higher accuracy, higher power tracking mode when the tracked device 60 is not static and/or is relatively difficult to track. The higher accuracy, higher power tracking mode may be suitable for use in bright rooms, when the display 12B is dark, or otherwise when the resulting captured image data may have relatively low contrast between its respective portions of image data. The higher accuracy, higher power tracking mode may also be suitable for use when the display 12B is blocked, such as by a user, another device, or the electronic device 10 itself like when the electronic device 10 is flipped over and the display 12B is no longer visible or able to be captured by the camera subsystem 102 of the tracking device 62). The high power tracking mode may use the first tracking data 82 and may validate the location determined using the first tracking data 82 with the second tracking data 230.

Figure 17:
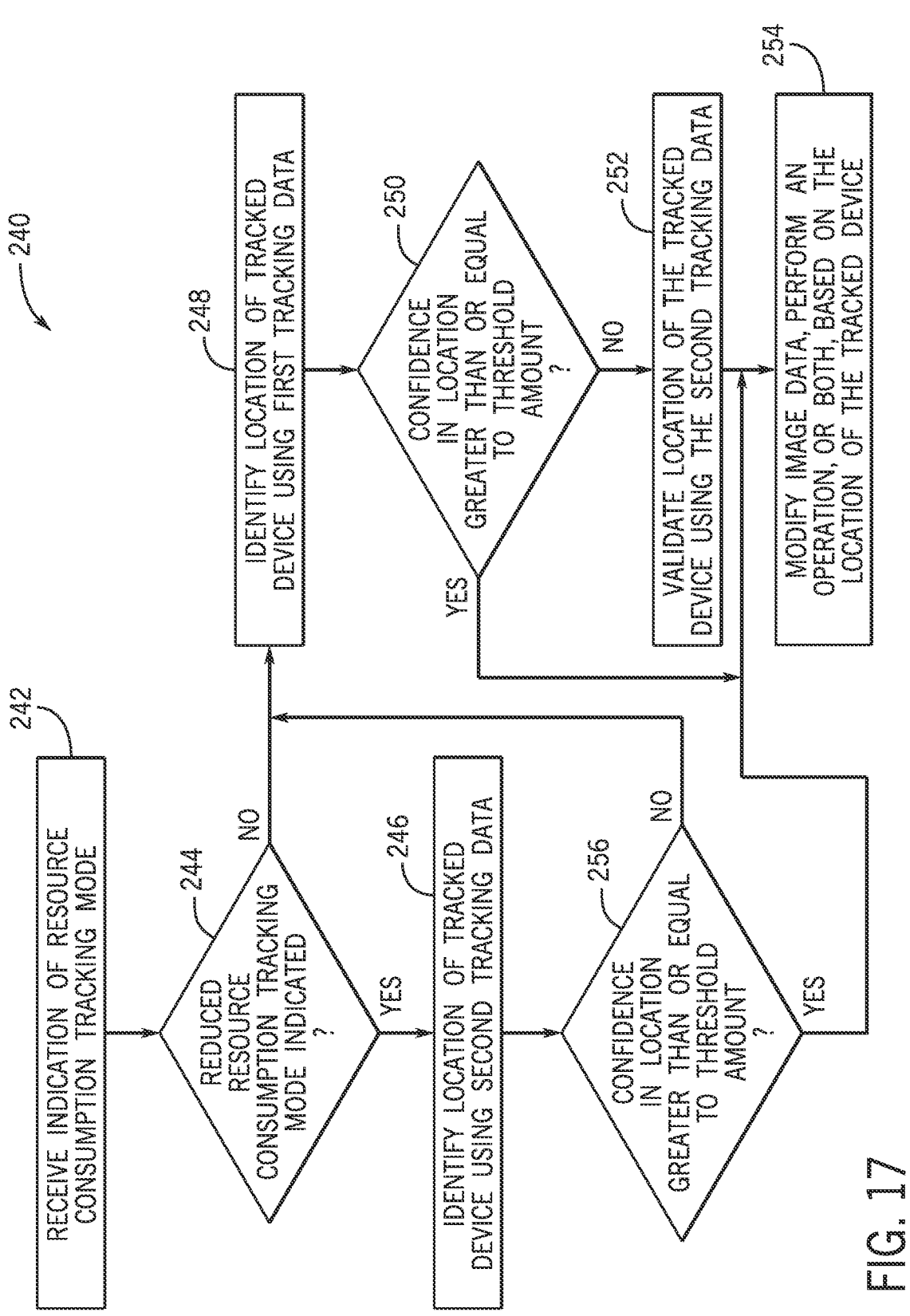
FIG. 17 is a flow diagram of a process for operating the tracking device of FIG. 16 during a tracking operation corresponding to the tracked device of FIG. 16, in accordance with an embodiment.

Example operations based on the first tracking data 82 and the second tracking data 230 are shown in FIG. 17. FIG. 17 is a flow diagram of a process 240 for operating the tracking device 62 during a tracking operation. The process 240 may be performed by a controller of the processor core complex 18 of the tracking device 62 in response to executing instructions stored in a tangible, non-transitory, computer-readable medium, such as the local memory 20, the main memory storage device 22, or the like of the tracking device 62. For ease of description, the process 240 is described as performed by the tracking device 62 as a whole. Moreover, the operations of the process 240 are shown in a particular order; however, some of the operations may be performed in a different order than what is presented.

At block 242, the tracking device 62 may receive an indication of a resource consumption tracking mode. A first indication (e.g., control signal, flag, data) may indicate a first tracking mode and a second indication may indicate a second tracking mode. Similar methods and systems for indications may be used to indicate precision modes. Thus, the determination at block 242 may sometimes be one for a reduced precision tracking mode. A lack of the first indication may indicate the second tracking mode. The tracking device 62 may receive an input at an input device or touch pixel of the display 12A that generates the first indication and/or may include control circuitry that generates the first indication in response to determining to enter the reduced power consumption mode.

After receiving and/or generating the first indication, the tracking device 62 may, at block 244, determine whether a reduced resource consumption tracking mode is indicated. The reduced resource consumption tracking mode may correspond to a first of two resource consumption tracking modes (e.g., higher and lower consumption modes).

When indicated, the tracking device 62 may, at block 246, identify the location of the tracked device 60 using the second tracking data 230. Using the second tracking data 230 to determine the location may consume fewer computing or power resources relative to using image data processing operations associated with processing the first tracking data 82. The second tracking data 230 may include any suitable data usable for locating or triangulating to the tracked device 60 from one or more reference points, such as the location of the tracking device 62 itself. In some cases, the tracking device 62 may correlate the location of the tracked device 60 to a direction or orientation that a relatively strongest signal strength of the second tracking data 230 originates. Determining the location of the tracked device 60 using the second tracking data 230 without the first tracking data 82 may consume fewer processing resources, and thus be performed during the reduced resource consumption tracking mode. As discussed below, the tracking device 62 may determine that the location determined based on the second tracking data 230 has a low confidence value in its accuracy by considering, at block 256, whether the confidence in the location determined based on the second tracking data 230 in greater than or equal to a threshold amount. When the confidence value is greater than or equal to the threshold value, the tracking device 62 determines that the confidence value is suitably high and, at block 254, modifies image data, performs an operation, or both, based on the location determined using the second tracking data 230.

However, when the confidence value is less than the threshold value, the tracking device 62 may find the confidence value too low and thus may verify the location by, at block 248, identifying the location of the tracked device 670 using the first tracking data 82. Another time where the first tracking data 82 may be considered is when the reduced resource mode is not indicated at block 244.

Referring back to block 244 operations, when the reduced resource mode is not indicated, the tracking device 62 may, at block 248, identify the location of the tracked device 60 using the first tracking data 82. This may involve performing operations of FIGS. 10 and 11, and thus descriptions are relied on herein. At block 250, the tracking device 62 may determine whether a confidence amount corresponding to the location of the tracked device 60 determined based on the first tracking data being correct is greater than or equal to a threshold amount.

Any suitable method may be used to evaluate a confidence level at block 256 and/or block 250. For example, certain conditions may trigger a relatively low confidence level. The determination may be based on a population mean, a standard deviation, or any other suitable statistical determination to identify a confidence value in the location determination. For example, when the tracked device 60 has the display 12B blocked from the camera subsystem 102, the tracking device 62 may determine, at block 250, a confidence in the location determined based on the first tracking data 82 is a value less than or equal to the threshold amount, and thus may, at block 252, validate the location of the tracked device 60 based on the second tracking data 230.

To elaborate, in response to determining that the confidence value calculated for the determined location of the tracked device 60 based on the first tracking data 82 is not greater than or equal to the threshold amount, the tracking device 62 may validate, at block 252, the determined location using the second tracking data 230. For example, a location of the tracked device 60 may be determined by comparing the second tracking data 230 to expected tracking data or a known reference location to determine a difference used to identify the location. The location based on the first tracking data 82 may be compared to the location found based on the second tracking data 230 to validate or reject the location.

Referring back to block 256, when evaluating the confidence value for the location determined based on the second tracking data 230, the tracking device 62 may identify, at block 248, the location of the tracked device 60 using the first tracking data 82. Although the tracking device 62 was originally instructed to operate in the reduced resource consumption tracking mode (e.g., lower power consumption), the tracking device 62 may thus use operations of block 256 to determine to further validate the location determined based on the second tracking data using operations of at block 246. The determinations of block 256 may permit selective enablement of the higher resource consumption mode when higher accuracy in location or confidence levels is requested.

In response to determining that the confidence value calculated for the determined location of the tracked device 60 is greater than or equal to the threshold amount, or after validating the location of the tracked device 60, the tracking device 62 may, at block 254, modify image data, perform an operation, or both, based on the location of the tracked device 60 (e.g., the location of the display 12B). Operations performed here are similar to those of block 178 of FIG. 11 and may be based on either the second tracking data 230, the first tracking data 82, or both.

The tracking device 62 may use motion sensing data from an inertial measurement unit (IMU) of the tracked device 60, its own IMU, or both to predict where within an image frame region that the display 12B is expected to be at a future time. Data from the IMUs may be considered second tracking data 230, or secondary tracking data, as discussed in FIGS. 16-18. Each IMU may sense velocity, acceleration, amplitudes, torques, rotations and/or changes in any of the values, to help provide a numerical indication of IMU movement. Predicting future locations of the tracked device 60 may reduce a total time spent identifying a location of the display 12B by reducing an amount of image data searched by the tracking device 62 to just the regions of image data expected to include indications of the display 12B.

The notification 100 signal may be used in addition to a refresh pulse, not shown in the figures. The tracked device 60 may send the refresh pulse each time that an image frame presented on the display 12B is updated, and thus may send the refresh pulse at a rate that matches a refresh rate of the display 12B. The tracking device 62 may synchronize its camera subsystem image capturing operations to equal or be substantially the same as the refresh rate of the display 12B in response to receiving each of the refresh pulses. Aligning the refresh rate of the display 12B with the image capturing operations, and subsequent refresh rate of the display 12A, may reduce aliasing or blurring artifacts that may occur when presenting the display 12B in captured image data via the display 12A.

The tracking device 62 and the tracked device 60 may operate to provide an XR system. To do so, the tracking device 62 may transmit an initial initiation signal that instructs the tracked device 60 to operate to present the tracking data and/or to prepare to be tracked. Thus, the tracked device 60 may not always operate to present designated tracking data 82. The operations described herein may correspond to an operational mode that may be entered into and exited. The operational mode may be entered based on whether or not the tracking device 62 is being operated to provide an extended reality experience (e.g., modified image) presented based on the location of the tracked device 60. The tracking device 62 may track the object 64 without also tracking the tracked device 60, and vice versa, or the tracking device 62 may track both the object 64 and the tracked device 60.

An XR system may provide an entertainment system. In some cases, an XR system may be used to provide a service, such as an object-locating application that searched for tracked device 60 identification tags and generates graphical representations of instructions, directions, arrows or the like to guide a user interacting with the tracking device 62 toward the determined location of the tracked device 60. Other applications of these systems and methods may also apply although not particularly discussed.

Either of the confidence threshold levels (e.g., threshold amount used at block 256 and/or block 250) may be adjustable based on operation of the tracking device 62, application executing on the tracking device 62 (e.g., accuracy-critical application or not), or the like. For example, when a first application being executed indicates a first level of accuracy, the tracking device 62 may adjust or increase the value of threshold to be more stringent, or a higher value, than the threshold used for a second application that indicates a second level of accuracy, or does not indicate a level of accuracy.

Furthermore, these systems and methods described herein may apply beyond proprietary boundaries of hardware and/or software of electronic devices. For example, a tracked device 60 of one company and/or operating system may be compatible to operate in conjunction with a tracking device 62 of another company or operating system. This may include using proprietary wireless frequencies or characteristics. The tracking device 62 may register to an output wireless signal from the tracked device 60 such that each may communicate at least tracking signals to each other for the tracking device 62 to determine the location of the tracked device 60.

Systems and methods described herein may be used in known or unknown ambient environments 66. For example, a home, primary residence, place of work, or the like may be known ambient environments 66, which may have objects within the known ambient environment 66 with fixed locations that are known to the tracking device 62. The tracking device 62 may undergo a calibration, orientation, or otherwise initializing operation to "know" or learn an ambient environment 66. These initializing operations may occur over time through repeated use of the tracking device 62 in a respective ambient environment 66 In these environments with objects at known, fixed locations, the tracking device 62 may use a tiered system to guide a user toward the tracked device 60 and/or or to track the tracked device 60. When searching for the tracked device 60, the tracking device 62 may use the second tracking data 230 to instruct a user to move it closer to the tracked device 60 at a relatively high granularity. As the tracking device 62 gets closer to the tracked device 60, the tracking device 62 may switch to locating the tracked device 60 using the first tracking data 82 as a way to reduce granularity and make the locating operation more accurate. For example, the tracking device 62 may originally be in located in a right side of a room and may use a locating operation based on the second tracking data 230 to determine whether the tracked device 60 is also in the right side of the room, or is in the left side of the room, or is in a different room. Based on its determination of relative location of the tracked device 60 to the room, the tracking device 62 may generate instructions to guide a movement of the tracking device 62 toward signals being generated by the tracked device 60. When a threshold distance from the tracked device 60, when signal strength of the second tracking data is greater than a threshold strength value), or in response to a different condition, the tracking device 62 may switch to locating the tracked device 60 using the first tracking data 82, and then may use more specific generated graphics to indicate the location of the tracked device 60 and/or to track the location of the tracked device 60 (e.g., generated graphics surrounding the display 12B of the tracked device 60 in the virtual space)

Thus, the technical effects of the present disclosure include systems and methods that improve tracking operations of a tracking device by operating the tracking device to monitor and track known markers presented by a tracked device. The tracking device may be part of an XR system that presents an enhancement, a modification, an animation or the like in association with the tracked device based on the tracked location of the known markers. By providing the tracking device with a known marker to track on the tracked device, the tracking device may track an electronic display of the tracked device, the known marker, the tracked device, or any combination thereof, with increased accuracy and reduced perceivable delays than otherwise experienced when trying to track a display used to present rapidly changing or variable image data. When tracking operations based on known markers presented via a display of the tracked device are performed continuously, mixed reality augmentations will "stick" very smoothly on top or around, even while the tracked device changes images presented via the display. To further improve images presented via the tracking device, the tracked device may transmit periodic pulses at a rate that matches or is substantially similar to a refresh rate of its display such that the tracking device may align its refresh rate with that of the tracked device. Doing so may reduce flashing or other perceivable image artifacts generated in images of the display presented using an unaligned refresh rate.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Furthermore, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
a display; and
processing circuitry configured to:
generate a first image frame based on overlaying tracking data on image content;
send a notification comprising an indication of the tracking data to a tracking device at a time corresponding to a first time duration before the first image frame is presented via the display, wherein the first time duration corresponds to an amount of time used to prepare a camera subsystem of the tracking device to operate; and
provide the first image frame to the display, wherein the tracking data comprises image data configured to enable the display to be detected by the tracking device when the display is displaying the first image frame.

2. The system of claim 1, wherein the processing circuitry is configured to:
generate a second image frame to be presented via the display; and
provide the second image frame via the display without providing the tracking data.

3. The system of claim 1, wherein the processing circuitry is configured to:
receive sensed data indicative of an ambient environment associated with the display; and
generate the tracking data based on the sensed data to compensate for the ambient environment.

4. The system of claim 1, wherein the processing circuitry is configured to generate a refresh pulse at a rate based on a refresh rate associated with presenting the first image frame relative to a second image frame.

5. The system of claim 1, wherein the processing circuitry is configured to:
identify a subset of the image content as the tracking data; and
generate the notification to send the tracking data to the tracking device.

6. The system of claim 1, wherein the processing circuitry is configured to provide the tracking data with the first image frame via the display at least in part by overlaying the tracking data visually on content of the first image frame for a second time duration less than a total presentation time associated with the first image frame.

7. The system of claim 1, wherein the processing circuitry is configured to:
establish communication with the tracking device via a communicative coupling; and
send the notification configured to indicate that the tracking data is overlaid on a subsequent image frame to the tracking device via the communicative coupling.

8. The system of claim 7, wherein the processing circuitry is configured to:
receive motion data from a motion sensor, wherein the motion data is configured to indicate an expected motion of the display; and
send the motion data to the tracking device via the communicative coupling.

9. The system of claim 1, wherein at least a portion of the image content is visible on at least a portion of the display.

10. The system of claim 1, wherein the image data comprises a watermark image, a patterned image, or any combination thereof.

11. A method, comprising:

generating, via processing circuitry, an image frame based on overlaying tracking data on image content;

sending, via the processing circuitry, a notification comprising an indication of the tracking data to a tracking device at a time corresponding to a time duration before the image frame is presented via a display, wherein the time duration corresponds to an amount of time used to prepare a camera subsystem of the tracking device to operate; and providing, via the processing circuitry, the image frame to the display, wherein the tracking data comprises image data configured to enable the display to be detected by the tracking device when the display is displaying the image frame.

12. The method of claim 11, comprising:

receiving, via the processing circuitry, an indication of a delay value; and programming, via the processing circuitry, a delay circuit based on the delay value.

13. The method of claim 11, comprising generating, via the processing circuitry, the notification, wherein the notification is configured to compensate for a variable refresh rate associated with presenting the image frame.

14. The method of claim 13, comprising:

determining, via the processing circuitry, the time at which the camera subsystem is to be operated to capture an image, wherein the time is determined based on the variable refresh rate and the amount of time used to prepare the camera subsystem to capture the image data of the display; and generating, via the processing circuitry, the notification to include a timestamp corresponding to the time.

15. The method of claim 11, comprising designating a subset of the image content as the tracking data, wherein the subset of the image content corresponds to a portion of the image content a threshold amount different in average brightness, in average color value, or both from one or more other portions of the image frame.

16. A tangible, non-transitory, computer-readable medium, comprising instructions that, when executed by a processor, are configured to cause a device configured to be tracked to perform operations comprising:

receiving sensed data indicative of an ambient environment associated with a display;

generating an image frame based on overlaying tracking data on image content and based on the sensed data, wherein the tracking data comprises image data configured to enable the display to be detected by a tracking device when the display is displaying the image frame;

sending a notification comprising an indication of the tracking data to the tracking device at a time corresponding to a time duration before the image frame is presented via the display, wherein the time duration corresponds to an amount of time used to prepare a camera subsystem to operate; and providing the image frame to the display.

17. The tangible, non-transitory, computer-readable medium of claim 16, wherein the operations comprise generating a refresh pulse at a rate that equals a refresh rate corresponding to the image frame.

18. The tangible, non-transitory, computer-readable medium of claim 16, wherein the operations comprise overlaying the tracking data on the image content based on blending the tracking data with the image content, wherein blending the tracking data with the image content comprises adjusting a brightness level of a portion of the image content, and wherein the portion of the image content corresponds to a location of the tracking data overlayed on the image content.

19. The tangible, non-transitory, computer-readable medium of claim 16, wherein the operations comprise:

establishing a communicative coupling with the tracking device; and sending the notification to the tracking device via the communicative coupling.

20. The tangible, non-transitory, computer-readable medium of claim 19, wherein the operations comprise:

receiving motion data from a motion sensor; and sending the motion data to the tracking device via the communicative coupling.

* * * * *